US010887662B2

(12) United States Patent
Lida

(10) Patent No.: US 10,887,662 B2
(45) Date of Patent: Jan. 5, 2021

(54) CHANGING VISUALLY LOSSLESS COMPRESSION RATIO WHILE MAINTAINING PARAMETERS RELATED TO UNCOMPRESSED VIDEO

(71) Applicant: Valens Semiconductor Ltd., Hod Hasharon (IL)

(72) Inventor: Eyran Lida, Kfar Ha-Oranim (IL)

(73) Assignee: Valens Semiconductor Ltd., Hod Hasharon (IL)

( * ) Notice: Subject to any disclaimer, the term of this patent is extended or adjusted under 35 U.S.C. 154(b) by 993 days.

(21) Appl. No.: 14/834,661

(22) Filed: Aug. 25, 2015

(65) Prior Publication Data

US 2016/0219243 A1    Jul. 28, 2016

Related U.S. Application Data

(60) Provisional application No. 62/107,387, filed on Jan. 24, 2015.

(51) Int. Cl.
*H04N 21/647* (2011.01)
*H04N 21/2343* (2011.01)
(Continued)

(52) U.S. Cl.
CPC ..... *H04N 21/64769* (2013.01); *H04N 7/0102* (2013.01); *H04N 7/0117* (2013.01);
(Continued)

(58) Field of Classification Search
CPC ........... H04N 21/64769; H04N 19/186; H04N 19/30; H04N 19/42; H04N 19/88
(Continued)

(56) References Cited

U.S. PATENT DOCUMENTS 5,839,100 A   11/1998  Wegener
5,982,436 A   11/1999  Balakrishnan et al.
(Continued)

OTHER PUBLICATIONS

International search report and written opinion of the international searching authority, PCTAL2016/050071 , dated May 17, 2016.
(Continued)

*Primary Examiner* — Sath V Perungavoor
*Assistant Examiner* — Kristin Dobbs
(74) *Attorney, Agent, or Firm* — Active Knowledge Ltd.

(57) ABSTRACT

Methods and systems for compression that maintains parameters related to uncompressed video (PRTUV) while changing video compression ratios on-the-fly. One embodiment of a system includes: A video transmitter that receives incoming high-definition uncompressed video (HD-UV) characterized by certain PRTUV. The video transmitter compresses the incoming HD-UV into a first compressed video of ratio between 1:1 and 5:1, and sends it over a communication link to a receiver that decompresses the video to an outgoing HD-UV. When the video transmitter receives a command to smoothly change on-the-fly the compression to a second compressed video of ratio between 2:1 and 10:1, it makes the change without interrupting the continuous flow of the incoming HD-UV. Wherein the outgoing HD-UV maintains the PRTUV before, during, and after the change from the first compressed video to the second compressed video.

20 Claims, 17 Drawing Sheets

(51) Int. Cl.
*H04N 21/24* (2011.01)
*H04N 21/242* (2011.01)
*H04N 19/42* (2014.01)
*H04N 19/88* (2014.01)
*H04N 7/01* (2006.01)
*H04N 19/186* (2014.01)
*H04N 19/30* (2014.01)
*H04N 5/44* (2011.01)

(52) U.S. Cl.
CPC ......... *H04N 7/0125* (2013.01); *H04N 19/186* (2014.11); *H04N 19/30* (2014.11); *H04N 19/42* (2014.11); *H04N 19/88* (2014.11); *H04N 21/23439* (2013.01); *H04N 21/234309* (2013.01); *H04N 21/242* (2013.01); *H04N 21/2402* (2013.01); *H04N 21/2407* (2013.01); *H04N 21/64738* (2013.01); *H04N 5/44* (2013.01)

(58) Field of Classification Search
USPC .................................................... 375/240.02
See application file for complete search history.

(56) References Cited

U.S. PATENT DOCUMENTS

| | | | |
|---|---|---|---|
| 6,065,050 A | | 5/2000 | DeMoney |
| 6,172,672 B1* | | 1/2001 | Ramasubramanian ..................... H04N 7/17336 348/14.14 |
| 6,198,477 B1 | | 3/2001 | Kurtze et al. |
| 6,519,283 B1 | | 2/2003 | Cheney et al. |
| 6,785,338 B1 | | 8/2004 | Reitmeier et al. |
| 7,190,284 B1 | | 3/2007 | Dye et al. |
| 8,165,732 B2 | | 4/2012 | Corbefin et al. |
| 8,526,505 B2 | | 9/2013 | Kim et al. |
| 8,705,628 B2 | | 4/2014 | Tanaka |
| 8,718,135 B2 | | 5/2014 | Au et al. |
| 8,781,000 B2 | | 7/2014 | Girardeau, Jr. et al. |
| 2001/0055336 A1 | | 12/2001 | Krause et al. |
| 2004/0042553 A1 | | 3/2004 | Elbaz et al. |
| 2008/0253330 A1 | | 10/2008 | Bartlett |
| 2011/0122877 A1 | | 5/2011 | Gelke et al. |
| 2014/0089516 A1* | | 3/2014 | Sevin ................... H04L 1/0067 709/231 |
| 2014/0357993 A1 | | 12/2014 | Hiriyannaiah et al. |
| 2015/0288911 A1 | | 10/2015 | Dickens et al. |
| 2015/0288919 A1* | | 10/2015 | Labosco ................ H04N 19/44 348/445 |

OTHER PUBLICATIONS

Shirai, D., Kawano, T., Fujii, T., Kaneko, K., Ohta, N., Ono, S., Arai S., & Ogoshi, T. Real time switching and streaming transmission of uncompressed 4K motion pictures. (2009). Future Generation Computer Systems, 25(2), 192-197.
Win the Live Sports Contribution Game Every Time, Net Insight.
Patel, D., Bhogan, V., & Janson, A. Simulation and Comparison of Various Lossless Data Compression Techniques based on Compression Ratio and Processing Delay. (2013). International Journal of Computer Applications,81(14).
Ponomarenko, N., Zemlyachenko, A., Lukin, V., Egiazarian, K., & Astola, J. Performance analysis of visually lossless image compression. (Jan. 2012). Proceedings of the Sixth International Workshop on Video Processing and Quality Metrics (VPQM).
Chandler, D. M., Dykes, N. L., & Hemami, S. S. Visually lossless compression of digitized radiographs based on contrast sensitivity and visual masking. (Apr. 2005). Medical Imaging (pp. 359-372). International Society for Optics and Photonics.
Aziz, H. M., & Lundberg, L. Graceful degradation of mobile video quality over wireless network. (Jun. 2009). Proceedings of the IADIS International Conference Informatics.(Algarve, Portugal (pp. 175-180).
Parris, C., & Ferrari, D. A dynamic connection management scheme for guaranteed performance services in packet-switching integrated services networks. (1993). International Computer Science Institute.
Parris, C. J., Ventre, G., & Zhang, H. Graceful adaptation of guaranteed performance service connections. (Mar. 1993).
Mary Jansi Rani. Y, Pon. L.T. Thai, & John Peter. K. Visually Lossless Compression for Color Images with Low Memory Requirement using Lossless Quantization. (Jul. 3, 2012) International Journal of Soft Computing and Engineering (IJSCE).
Eckert, M. P., & Bradley, A. P. Perceptual quality metrics applied to still image compression. (1998). Signal processing, 70(3), 177-200.
H.264 video compression standard. New possibilities within video surveillance. 2008 Axis Communications.
H.264/AVC Intra-only Compression for P2 applications, Sep. 7, 2007, Panasonic Broadcast Version 3.0.
Tico FPGA IP-cores, The new disruptive visually lossless light video compression.
Tico, the new disruptive light visually lossless compression technology will be officially released at IBC 2013, Aug. 28, 2013, intoPIX press release.
Multi-channel streaming for medical and multimedia industry applications.

* cited by examiner

CHANGING VISUALLY LOSSLESS COMPRESSION RATIO WHILE MAINTAINING PARAMETERS RELATED TO UNCOMPRESSED VIDEO

BACKGROUND

Uncompressed and compressed video systems require different communication rates, processors, and buffers. For example, an uncompressed Blu-Ray movie streamed with 1080p resolution (1920×1080 pixels) requires a channel bandwidth of about 1.19 Gbps, versus just 25 Mbps when compressed (using certain compression schemes). In another example, 60 Hz uncompressed video frames with 1920× 1080 pixels of 24 bits typically require a channel bandwidth of about 3 Gbps.

Video resolution and frame rates that are typically used in consumer products have been increasing at a dramatic pace. For example, in recent years, resolutions are transitioning from Standard Definition (480p) to High Definition (1080p) to Quad HD (2560×1440) to Ultra HD 4K (3840×2160), and frame rates are transitioning from 60 Hz to 120 Hz or even to 240 Hz. In addition, there is demand for increased color bit precision such as deep color that supports 30/36/48-bit values for three RGB colors. These conditions place a heavy load on interfaces for transferring uncompressed video data, such as High-Definition Multimedia Interface (HDMI).

Prior art systems cannot maintain timing and primary colors while changing video compression ratios on-the-fly, which is one of the features of the disclosed embodiments.

BRIEF SUMMARY

In one embodiment, a compression system configured to maintain parameters related to uncompressed video (PRTUV) while changing video compression ratios on-the-fly, includes the following elements: a video transmitter configured to receive incoming high-definition uncompressed video (HD-UV) characterized by the following PRTUV: uncompressed timing requirements, uncompressed number of video lines, and uncompressed number of video pixels per video line; the video transmitter is further configured to compress the incoming HD-UV into a first compressed video having a first compression ratio of between 1:1 and 5:1, and to send the first compressed video over a communication link to a video receiver; the video transmitter is further configured to receive a command to smoothly change on-the-fly the compression of the incoming HD-UV to a second compressed video having a second compression ratio of between 2:1 and 10:1, and to send the second compressed video over the communication link to the video receiver, without interrupting continuous flow of the incoming HD-UV; wherein the difference between the ratios of the first and second compressed videos is at least 25%; and the video receiver is configured to decompress the first or second compressed videos to an outgoing HD-UV; wherein the outgoing HD-UV maintains the PRTUV before, during, and after the change from the first compressed video to the second compressed video.

In another embodiment, a method for maintaining parameters related to uncompressed video (PRTUV) while changing video compression ratios on-the-fly, includes the following steps: receiving, by a video transmitter, incoming high-definition uncompressed video (HD-UV) characterized by the following PRTUV: uncompressed timing requirements, uncompressed number of video lines, and uncompressed number of video pixels per video line; compressing the incoming HD-UV into a first compressed video having a first compression ratio of between 1:1 and 5:1; sending the first compressed video over a communication link to a video receiver; receiving, by the video transmitter, a command to smoothly change on-the-fly the compression of the incoming HD-UV to a second compressed video having a second compression ratio of between 2:1 and 10:1; sending the second compressed video over the communication link to the video receiver, without interrupting continuous flow of the incoming HD-UV; wherein the difference between the ratios of the first and second compressed videos is at least 25%; and decompressing, by the video receiver, the first or second compressed videos to an outgoing HD-UV; wherein the outgoing HD-UV maintains the PRTUV before, during, and after the change from the first compressed video to the second compressed video.

BRIEF DESCRIPTION OF THE DRAWINGS

The embodiments are herein described, by way of example only, with reference to the accompanying drawings. In the drawings.

DETAILED DESCRIPTION

Figure 1A:
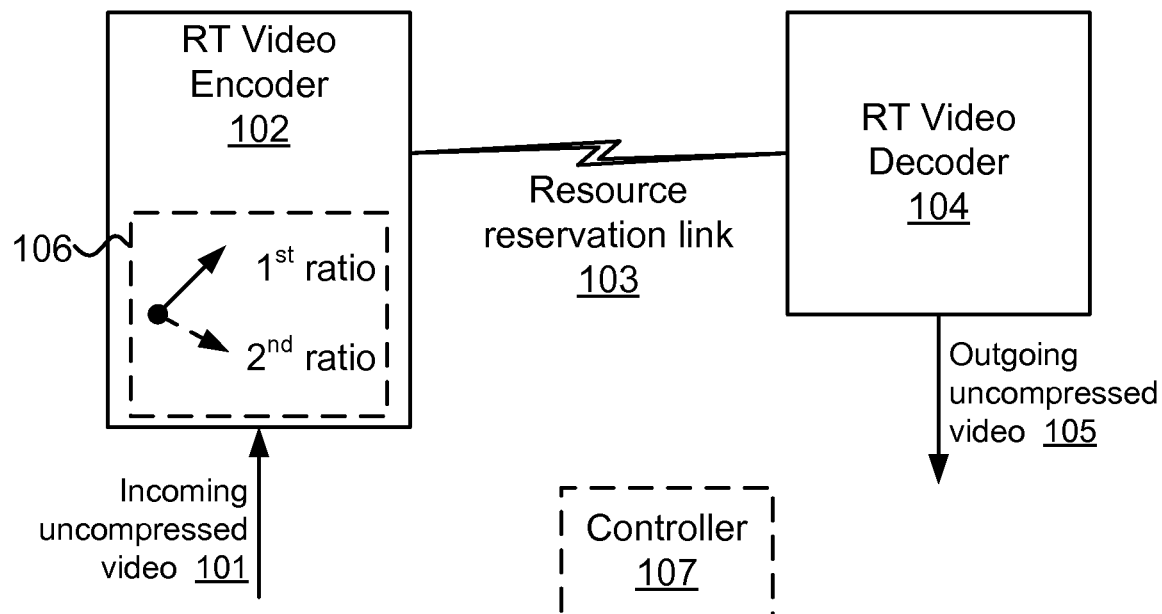
FIG. 1A illustrates one embodiment of a low-delay video streaming system having multiple video compression ratios.

FIG. 1A illustrates one embodiment of a low-delay video streaming system having multiple video compression ratios. The low-delay video streaming system includes at least a real-time video encoder (RT-VE) 102 and a real-time video decoder (RT-VD) 104. The RT-VE 102 receives an incoming high-definition uncompressed video (HD-UV) 101, processes the incoming HD-UV according to one of at least two compression ratios 106, and sends the processed video over a resource reservation communication link 103 to the RT-VD 104. In one example, the compression ratios 106 include a first compression ratio between 1:1 to 5:1 (referred to hereinafter as "up to 5:1"), and a second compression ratio that is up to 10:1; the difference between the first and second compression ratios is at least 25%. In some embodiments, the compression delay added by the RT-VE is below the duration of a single video frame for both compression ratios.

Figure 1B:
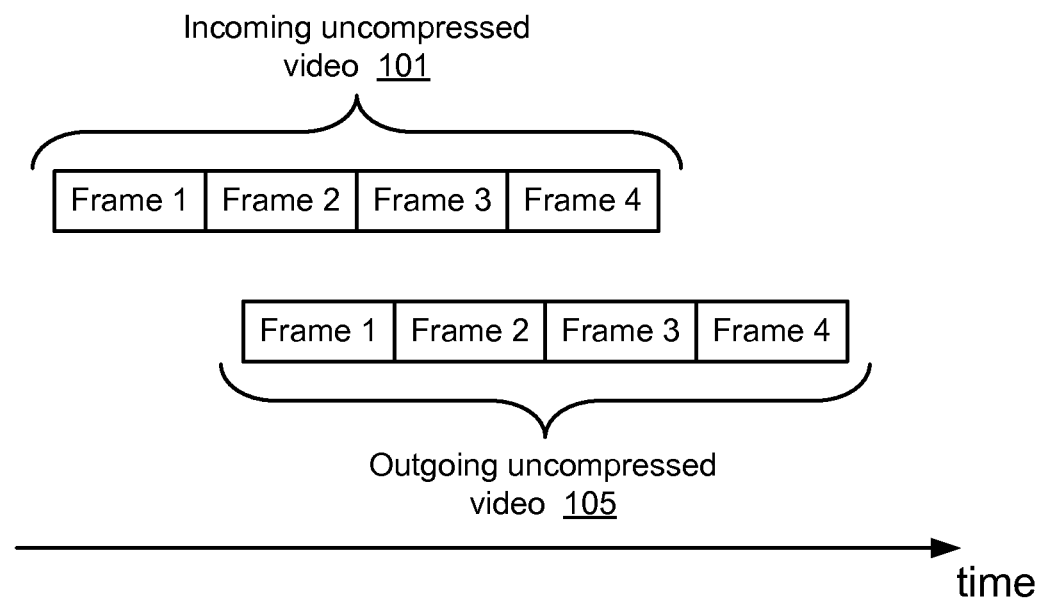
FIG. 1B illustrates a case where the total delay between corresponding frames is somewhat greater than one video frame.

The RT-VD 104 converts the processed video into outgoing HD-UV 105. The low-delay video streaming system is characterized by the fact that on-the-fly switches between the first and second compression ratios, while continuing to receive the incoming HD-UV uninterruptedly, are visually lossless switches. The on-the-fly switches also maintain a total delay, between corresponding frames of the incoming HD-UV and the outgoing HD-UV, which is below the duration of two video frames. FIG. 1B illustrates a case where the total delay between corresponding frames of the incoming HD-UV 101 and the outgoing HD-UV 105 is somewhat greater than one video frame.

In one example, visually lossless switching indicates that a comparison between corresponding frames of the incoming HD-UV and the outgoing HD-UV demonstrates that video synchronization signals and video timing signals are undamaged as a result of the on-the-fly switches. In another example, visually lossless switching indicates that a comparison between corresponding frames of the incoming HD-UV and the outgoing HD-UV demonstrates that the on-the-fly switches between the first and second compression ratios do not result in one or more missing video frames. In still another example, visually lossless switching indicates that a comparison between corresponding frames of the incoming HD-UV and the outgoing HD-UV demonstrates that the on-the-fly switches between the first and second compression ratios do not result in one or more missing video frame lines. In still another example, visually lossless switching indicates that a comparison between corresponding frames of the incoming HD-UV and the outgoing HD-UV demonstrates that the on-the-fly switches between the first and second compression ratios do not result in one or more missing video blanking signals. In still another example, visually lossless switching indicates that no pixels are lost, excluding color depth. And in still another example, visually lossless switching indicates that a user watching the outgoing HD-UV is not expected to perceive an interruption in the HD video quality due to the switches between the first and second compression ratios.

In one embodiment, the low-delay video streaming system further includes a controller 107 for setting the compression ratio of the system. The controller may be implemented as part of at least one of the following elements: the RT-VE, the RT-VD, and a network controller. In one example, the controller switches on-the-fly from the first compression ratio to the second compression ratio in order free up bandwidth for a new additional video stream.

In one embodiment, the low-delay video streaming system may feature a sub-frame delay in which the total delay between corresponding frames of the incoming HD-UV 101 and the outgoing HD-UV 105 may be below the duration of a single video frame.

In one embodiment, the low-delay video streaming system features smooth compression changes where the on-the-fly switches between the first and second compression ratios do not interrupt the flow of the uncompressed video from the decoder. Additionally or alternatively, the low-delay video streaming system may maintain a total delay that does not change when switching on-the-fly between the first and second compression ratios.

Figure 1C:
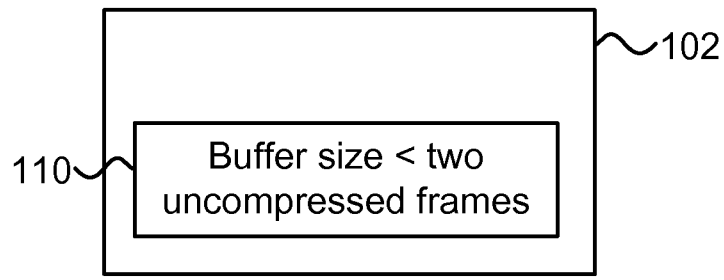
FIG. 1C illustrates one embodiment of an encoder buffer able to store less than two HD-UV frames.

FIG. 1C illustrates one embodiment of an encoder buffer 110 able to store less than two HD-UV frames. The encoder buffer 110 may be implemented as part of the RT-VE 102, and stores the incoming HD-UV 101 for the purpose of making the calculations required to compress the incoming HD-UV 101 into the compressed video. Optionally, the encoder buffer 110 may be able to store less than one HD-UV frame, or even just a few HD-UV lines.

Figure 1D:
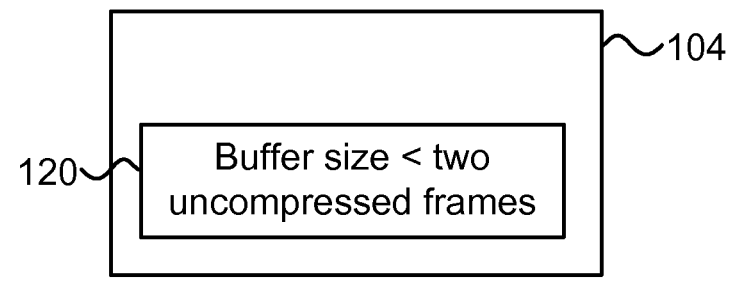
FIG. 1D illustrates one embodiment of a decoder buffer able to store less than two HD-UV frames.

FIG. 1D illustrates one embodiment of a decoder buffer 120 able to store less than two HD-UV frames. The decoder buffer 120 may be implemented as part of the RT-VD 104, and stores the incoming processed video for the purpose of making the calculations required to extract the outgoing HD-UV 105 from the processed video. Optionally, the decoder buffer 120 may be able to store less than one outgoing HD-UV frame, or even just a few HD-UV lines.

Figure 2:
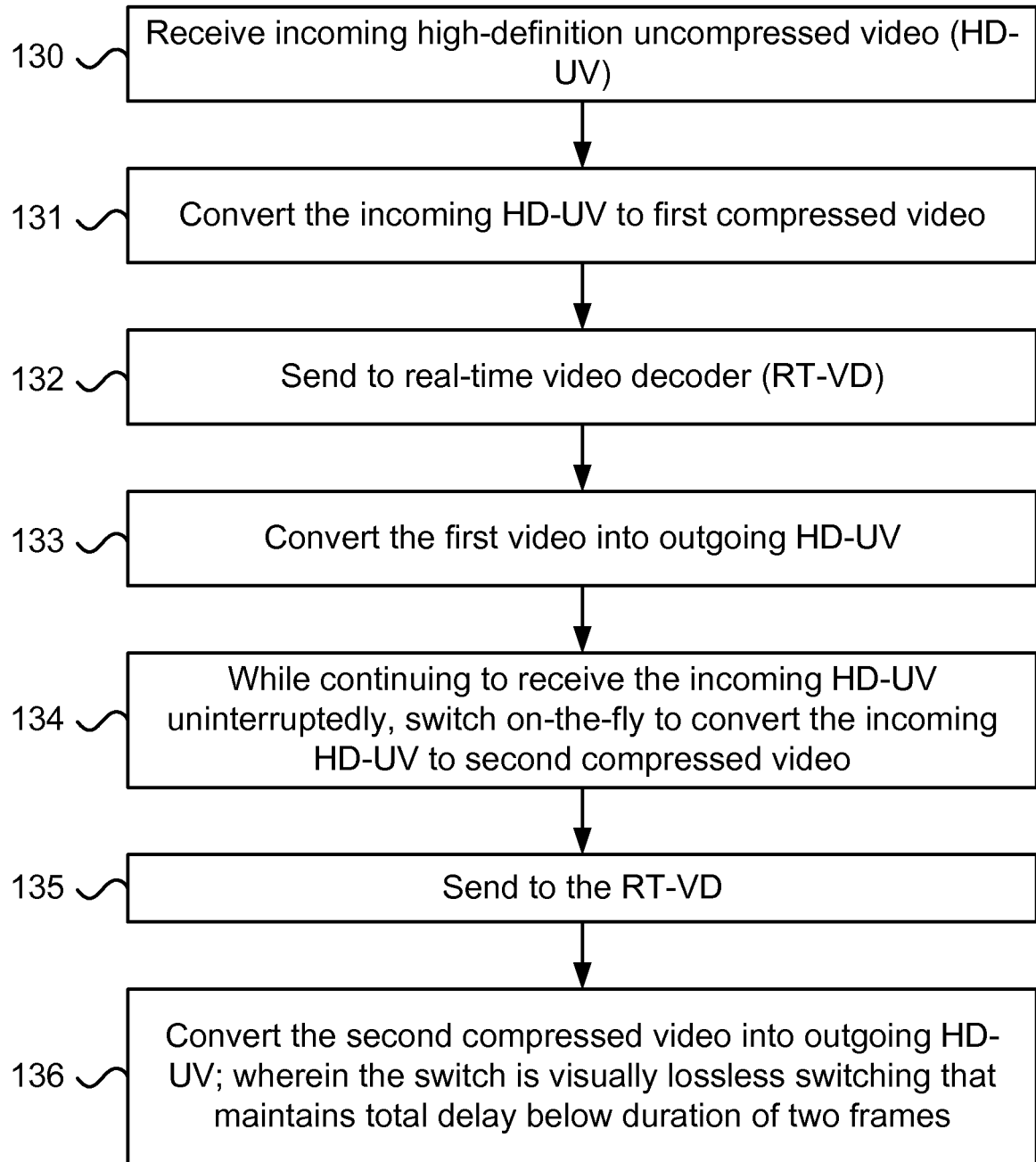
FIG. 2 illustrates one embodiment of a method for low-delay video streaming having multiple video compression ratios.

FIG. 2 illustrates one embodiment of a method for low-delay video streaming having multiple video compression ratios. The method includes the following steps: In step 130, receiving, by a real-time video encoder (RT-VE), an incoming high-definition uncompressed video (HD-UV). In step 131, converting the incoming HD-UV to a first compressed video, according to a first compression ratio of up to 5:1, while adding compression delay below duration of a single video frame. In step 132, sending the first compressed video to a real-time video decoder (RT-VD). In step 133, converting, by the RT-VD, the first compressed video into an outgoing HD-UV. In step 134, while continuing to receive the incoming HD-UV uninterruptedly, switching on-the-fly to converting the incoming HD-UV to a second compressed video, according to a second compression ratio of up to 10:1, while adding compression delay below duration of a single video frame, wherein the second compression ratio is deeper than the first compression ratio. In step 135, sending the second compressed video to the RT-VD. And in step 136, converting, by the RT-VD, the second compressed video into the outgoing HD-UV, such that the switching on-the-fly from the first compressed video to the second compressed video is a visually lossless switching that maintains a total delay, between corresponding frames of the incoming HD-UV and the outgoing HD-UV, below the duration of two video frames. Optionally, the switching on-the-fly from the first compressed video to the second compressed video is done utilizing a controller that sets the compression ratio of the low-delay video streaming.

In one example, the switching on-the-fly between the first compressed video and the second compressed video does not change the total delay between corresponding frames of the incoming HD-UV and the outgoing HD-UV. In another example, the switching on-the-fly between the first compressed video to the second compressed video shifts the total delay in less than the duration of one video line.

In one example, the RT-VE used by the method may utilize a buffer able to store less than two HD incoming uncompressed video frames in order to compress the incoming HD-UV into the second compressed video. Additionally or alternatively, the RT-VD used by the method may utilize a buffer able to store less than one incoming HD lossless video frame in order to extract the HD-UV from the first compressed video.

Figure 3A:
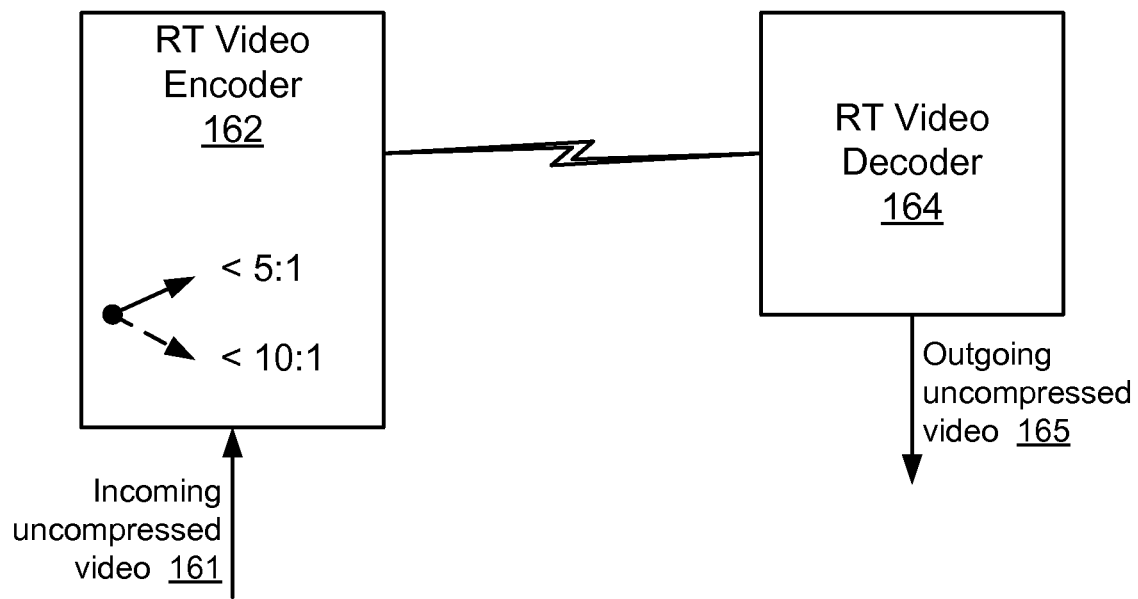
FIG. 3A illustrates one embodiment of a low-delay communication system that supports visually lossless switches between different video compression ratios.

FIG. 3A illustrates one embodiment of a low-delay communication system that supports visually lossless switches between different video compression ratios. The system includes at least a real-time video encoder (RT-VE) 162 and a real-time video decoder (RT-VD) 164. The RT-VE 162 receives an incoming high-definition uncompressed video (HD-UV) 161, and compresses the incoming HD-UV 161 into compressed video using either a first intra-frame compression of ratio of up to 5:1 or a second intra-frame compression of ratio of up to 10:1, wherein the difference between the first and second intra-frame compression ratios is at least 25%. The RT-VD 164 receives the compressed video and decompresses the compressed video into an outgoing HD-UV 165. In order to support visually lossless on-the-fly switches between the first and second compression ratios, the system maintains the delay between corresponding video pixels of the incoming HD-UV and the outgoing HD-UV below duration of two HD video frames, while continuing to receive the incoming HD-UV uninterruptedly.

In one example, using the on-the-fly visually lossless switches indicates that the differences between the incoming HD-UV and the outgoing HD-UV are visually lossless before, during, and after the switches between the first and second compression ratios are performed.

In another example, the video compression is not intra-frame compression, and each of the first and second compression ratios compresses at least 10 consecutive video frames between consecutive on-the-fly ratio switches.

Figure 3B:
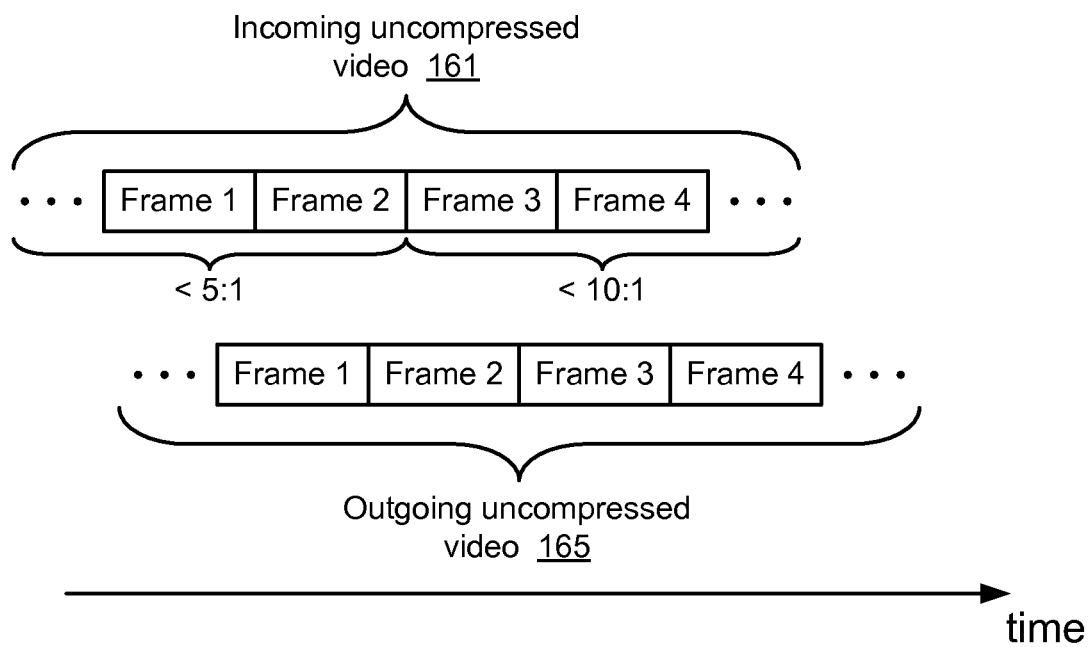
FIG. 3B illustrates a case where the total delay between corresponding frames is below the duration of a single video frame.

In still another example, the video compression is intra-frame compression. FIG. 3B illustrates a case where the total delay between corresponding frames of the incoming HD-UV 161 and the outgoing HD-UV 165 is below the duration of a single video frame.

Figure 4:
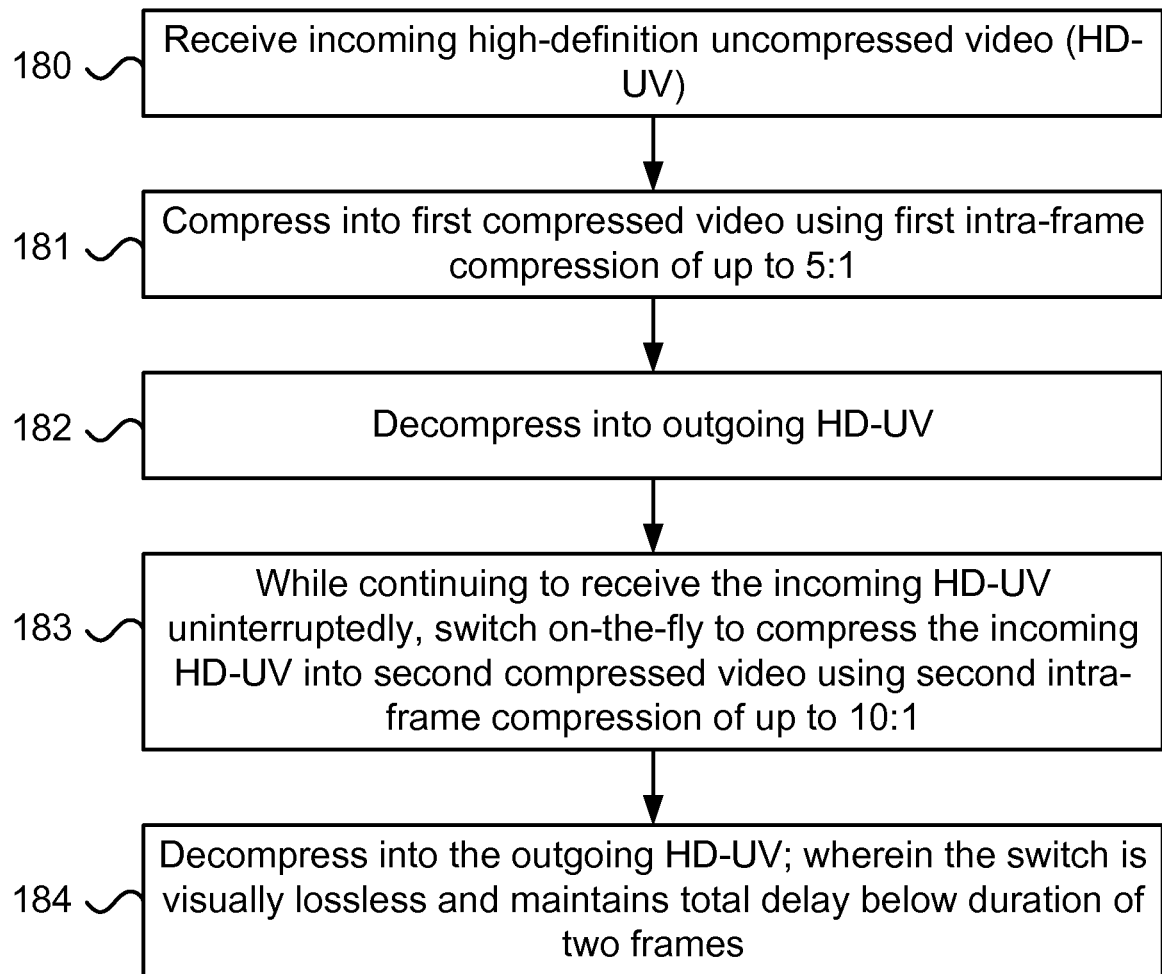
FIG. 4 illustrates one embodiment of a method for low-delay communication that supports visually lossless switches between different video compression ratios.

FIG. 4 illustrates one embodiment of a method for low-delay communication that supports visually lossless switches between different video compression ratios. The method includes the following steps: In step 180, receiving, by a real-time video encoder (RT-VE), an incoming high-definition uncompressed video (HD-UV). In step 181, compressing the incoming HD-UV into a first compressed video using a first intra-frame compression of ratio of up to 5:1, and sending it to a real-time video decoder (RT-VD). In step 182, decompressing, by the RT-VD, the first compressed video into outgoing HD-UV. In step 183, while continuing to receive the incoming HD-UV uninterruptedly, switching on-the-fly to compressing the incoming HD-UV into a second compressed video using a second intra-frame compression of ratio of up to 10:1, and sending it to the RT-VD, wherein the difference between the first and second intra-frame compression ratios is at least 25%. And in step 184, decompressing, by the RT-VD, the second compressed video into the outgoing HD-UV, wherein the switching on-the-fly is both visually lossless and maintains a total delay between the corresponding video pixels of the incoming HD-UV and the outgoing HD-UV that is below the duration of two HD video frames.

Optionally, the method further includes the step of compressing at least 10 consecutive video frames immediately before and after the switching between different video compression ratios. Additionally or alternatively, the delay between the corresponding video pixels of the incoming HD-UV and the outgoing HD-UV is shorter than the duration of a single video frame. Optionally, that short delay is also maintained when switching between different video compression ratios.

Visually lossless on-the-fly switching between compression ratios may be achieved using various mechanisms. In one embodiment, the video communication system includes a signaling mechanism that enables the encoder to notify the decoder about the switching between the compression ratios. In one example, the encoder embeds the notification in the packet header, and the decoder decodes the compressed data according to the notification. In another example, the notification from the encoder to the decoder is placed in the compressed metadata, and the decoder decodes the compressed data according to the metadata. In one embodiment, the visually lossless switching between the compression ratios takes place on the border between the compression units when no history is saved in the decoder. In one example, switching between intra-frame compressions takes place on the border between first and second (subsequent) frames, such that the first compression ratio is used to compresses the first frame while the second compression ratio is used to compresses the second (subsequent) frame following the first. In another example, the decoder decodes each frame or set of frames independently according to an indication about the compression used to compress the data. Additionally, the encoder may not notify the decoder explicitly about the switching between the compression ratios because the decoder is able to identify the change.

In another embodiment of a video system that achieves visually lossless on-the-fly switching between compression ratios, the encoder and decoder perform in parallel overlapping calculations at the time of switching between the compression ratios. For example, assuming the compression algorithms operate on ten video lines, then in the vicinity of the switching point, at least a portion of the ten video lines is processed in parallel by the two encoders and the two decoders (each pair of a decoder and encoder using one of the two corresponding compression ratios). Additionally, in this example, at least some overlapping compressed data is sent over the communication link to the decoders in order to achieve the visually lossless transition between the two compression ratios. That is, data corresponding to at least a portion of the ten video lines is sent twice over the communication link, using the two different compression ratios.

In still another embodiment of a video system that achieves visually lossless on-the-fly switching between compression ratios, time-sensitive video data is transmitted over a channel that also carries non-time-sensitive data, such as normal Ethernet data. Shortly prior to the time of switching the compression ratios, the throughput of the non-timesensitive data is reduced to provide the extra bandwidth needed to carry the excess time-sensitive data required for the visually lossless compression change, especially when time-sensitive data related to the two compression ratios is transmitted over the channel simultaneously.

In still another embodiment of a video system that achieves visually lossless on-the-fly switching between compression ratios, the system utilizes dynamic waveform modulation communication scheme, such as the one described in U.S. Pat. No. 8,565,337, titled "Devices for transmitting digital video and data over the same wires", which is incorporated herein by reference in its entirety. The bandwidth used by the dynamic waveform modulation communication system depends on channel properties. When the interferences get below a threshold, less sensitive data, such as video pixel data, is modulated using a higher modulation that consumes less bandwidth. The spared bandwidth is then available to carry the excess time-sensitive data required for the visually lossless compression switching, such as sending two streams from two video sources or sending two streams using different compression ratios. Optionally, this embodiment further includes a controller that executes the visually lossless switching when the interference conditions on the communication link are low enough to gain the spare bandwidth required for the visually lossless switching.

In still another embodiment, the on-the-fly switching between the compression ratios takes advantage of the fact that the viewer may be less sensitive to artifacts in the first (highest) and last (lowest) lines of the video frame, and in some cases the first and/or last lines may not be displayed on the screen. These lines may be compressed by a lossy compressor that generates observed artifacts, while the lines in between may be compressed by a lossless compressor.

Figure 5A:
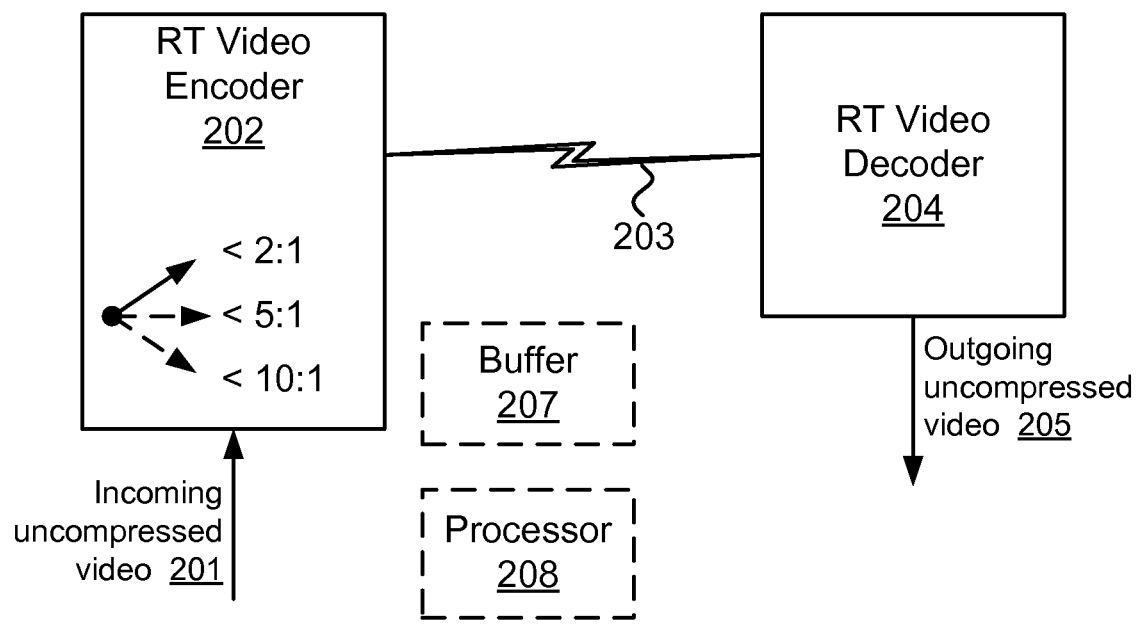
FIG. 5A illustrates one embodiment of a fixed delay video communication link.

FIG. 5A illustrates one embodiment of a fixed delay video communication link. The fixed delay video communication link includes at least a real-time video encoder (RT-VE) 202 and a real-time video decoder (RT-VD) 204. The RT-VE 202 receives an incoming high-definition uncompressed video (HD-UV) 201, compresses the incoming HD-UV 201 into first or second HD compressed video, and transmits the HD compressed video over a communication link to the RT-VD 204. And the RT-VD 204 decompresses the HD compressed video into the outgoing HD-UV 205. The fixed delay video communication link is characterized by the fact that while continuing to receive the incoming HD-UV uninterruptedly, on-the-fly switches between the first and second compression ratios are both visually lossless and maintain the same fixed delay between corresponding pixels of the incoming HD-UV and the outgoing HD-UV. In one embodiment, the fixed delay refers to accuracy shorter than the duration of a quarter of a HD-UV frame. In one embodiment, the first compression ratio of the first HD compressed video is between 1:1 and 2:1, the second compression ratio of the second HD compressed video is up to 5:1, and the difference between the first and second compression ratios is at least 25%.

Figure 5B:
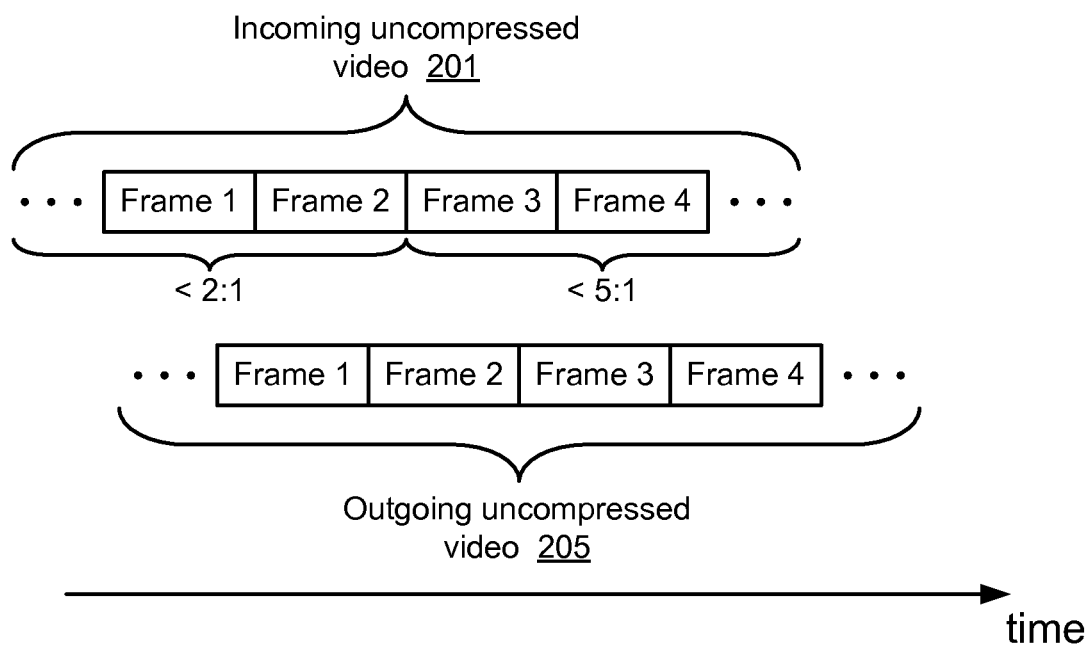
FIG. 5B illustrates a case where the total delay between corresponding frames is below the duration of a single video frame.

FIG. 5B illustrates a case where the total delay between corresponding frames of the incoming HD-UV 201 and the outgoing HD-UV 205 is below the duration of a single video frame, also in the vicinity of the transition between the first compression ratio (1:1-2:1) and the second compression ratio (up to 5:1).

In order for the fixed delay video communication link to support on-the-fly visually lossless switches between the first and second compression ratios, the steps of compressing the incoming HD-UV into the first or second HD compressed video and transmitting the HD compressed video over a communication link to the RT-VD may be interpreted according to one or more of the following three alternatives: (i) Compressing the incoming HD-UV into either the first or second HD compressed video and transmitting either the first or second HD compressed video over the communication link to the RT-VD, (ii) Compressing, at least for a short duration, the incoming HD-UV into both the first and second HD compressed videos and transmitting either the first or second HD compressed video over the communication link to the RT-VD, and/or (iii) Compressing, at least for a short duration, the incoming HD-UV into both the first and second HD compressed videos, and transmitting, for a duration shorter than 10 seconds, both the first and second HD compressed videos over the communication link to the RT-VD.

In one embodiment, at least some of the on-the-fly switches between the first and second compression ratios are performed gradually using a third compression ratio having value between the first and second compression ratios. The gradual switching is both visually lossless and maintains the same fixed delay between corresponding pixels of the incoming HD-UV and the outgoing HD-UV. For example, a transition from 2:1 compression to 4:1 compression may be performed gradually by switching from 2:1 to 3:1, and then switching from 3:1 to 4:1.

In one embodiment, the first compression ratio is uncompressed video. Additionally or alternatively, the fixed delay video communication link further includes a third HD compressed video having a third compression ratio up to 10:1, wherein the difference between the second and third compression ratios is at least 25%, and on-the-fly switches between the second and third compression ratios, while continuing to receive the incoming HD-UV uninterruptedly, are both visually lossless and maintain the same fixed delay between the corresponding pixels of the incoming HD-UV and the outgoing HD-UV.

In one embodiment, the first and second compressions are inter-frame compressions, and the video communication link further includes a buffer 207 for storing video pixels in order to equalize the delays associated with the HD compressed video and the HD compressed video. The fixed delay video communication link may further include a processor 208 for implementing one or more of the described features. In still another embodiment, the first compression is an inter-frame compression, and the second compression is an intra-frame compression.

Figure 5C:
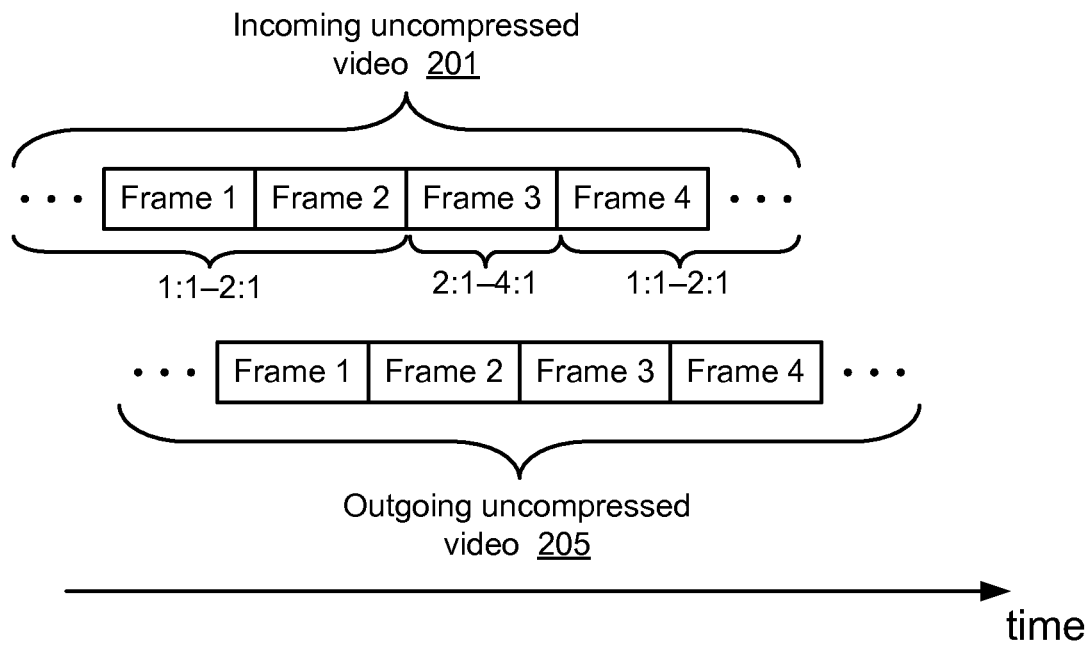
FIG. 5C illustrates one example of fast switching in which the second compression ratio is transmitted for a duration of one HD-UV frame until switching back to the first compression ratio.
Figure 5D:
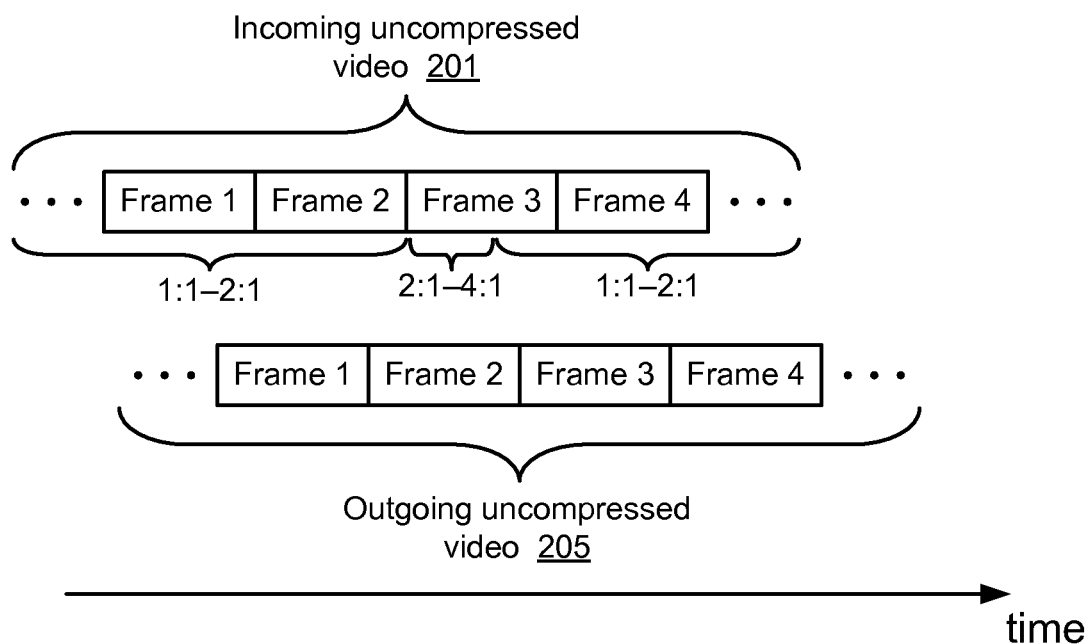
FIG. 5D illustrates another example of fast switching in which the second compression ratio is transmitted for a duration that is shorter than one HD-UV frame until switching back to the first compression ratio.

In one embodiment, the fixed delay video communication link supports short on-the-fly switches between the first and second compression ratios, such that the second compression ratio (e.g., 2:1-4:1) is used to transmit data for a duration shorter than the duration required to transmit up to 3 HD-UV frames before switching back to the first compression ratio (e.g., 1:1-2:1). FIG. 5C illustrates one example of fast switching in which the second compression ratio is used to transmit data for a duration of one HD-UV frame before switching back to using the first compression ratio. FIG. 5D illustrates another example of fast switching in which the second compression ratio is used to transmit data for a duration that is shorter than one HD-UV frame before switching back to using the first compression ratio.

Additionally or alternatively, the fixed delay video communication link may support short on-the-fly switches between the first and second compression ratios, such that the second compression ratio is used to transmit data for a duration shorter than the duration required to transmit 30 HD-UV frames before switching back to the first compression ratio.

In one example, visually lossless switching indicates that a comparison between corresponding frames of the incoming HD-UV and the outgoing HD-UV demonstrates that video synchronization signals and video timing signals are uninterrupted during the on-the-fly switches. In another example, visually lossless switching indicates that a comparison between corresponding frames of the incoming HD-UV and the outgoing HD-UV demonstrates that the on-the-fly switches between the first and second compression ratios do not result in one or more missing video frames. In still another example, visually lossless switching indicates that a comparison between the corresponding frames of the incoming HD-UV and the outgoing HD-UV demonstrates that the on-the-fly switches between the first and second compression ratios do not result in one or more missing video frame lines. In still another example, visually lossless switching indicates that a comparison between corresponding frames of the incoming HD-UV and the outgoing HD-UV demonstrates that the on-the-fly switches between the first and second compression ratios do not result in one or more missing video blanking signals. In still another example, visually lossless switching indicates that no pixels are lost, excluding color depth.

Figure 6:
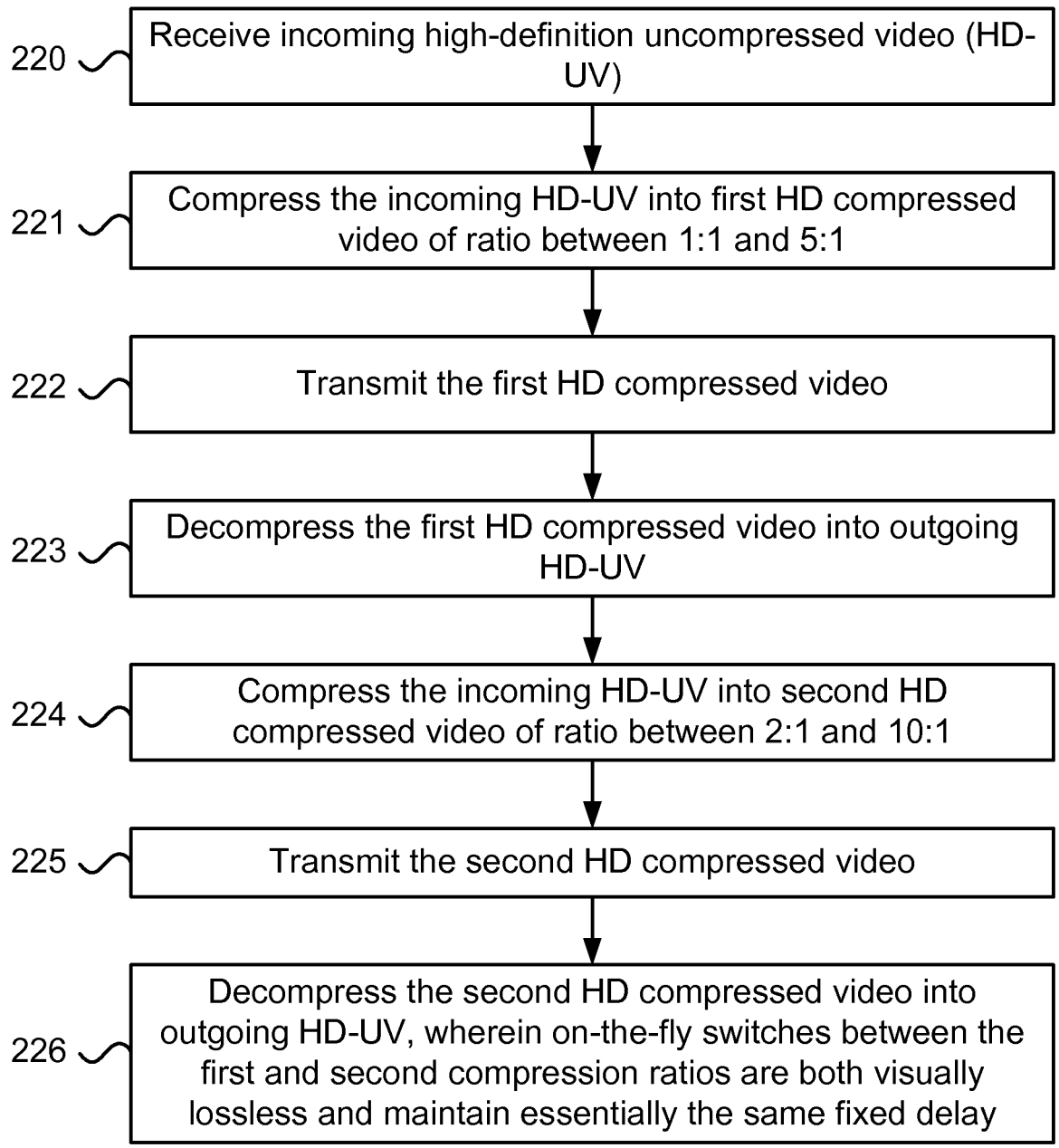
FIG. 6 illustrates one embodiment of a method for visually lossless video switching.

FIG. 6 illustrates one embodiment of a method for visually lossless video switching. The method includes the following steps: In step 220, receiving an incoming high-definition uncompressed video (HD-UV). In step 221, compressing, utilizing a processor, the incoming HD-UV into a first HD compressed video having a first compression ratio between 1:1 and 5:1. In step 222, transmitting the first HD compressed video over a communication link to a real-time video decoder (RT-VD). In step 223, decompressing, by the RT-VD, the first HD compressed video into an outgoing HD-UV. In step 224, compressing the incoming HD-UV into a second HD compressed video having a second compression ratio between 2:1 and 10:1, wherein the difference between the first and second compression ratios is at least 25%. In step 225, transmitting the second HD compressed video over the communication link to the RT-VD. And in step 226, decompressing, by the RT-VD, the second HD compressed video into an outgoing HD-UV. Optionally, on-the-fly switches between the first and second compression ratios, happening while continuing to receive the incoming HD-UV uninterruptedly, are both visually lossless and maintain the same fixed delay between corresponding pixels of the incoming HD-UV and the outgoing HD-UV. In one example, the fixed delay refers to accuracy shorter than the duration of a quarter of a HD-UV frame. In another example, the fixed delay refers to accuracy shorter than the duration of one HD-UV frame. And in still another example, the fixed delay refers to accuracy shorter than the duration of one HD-UV pixel.

In one embodiment, the first compression ratio is uncompressed video. Additionally or alternatively, the method further includes a third HD compressed video having a third compression ratio between 3:1 and 10:1, where the difference between the second and third compression ratios is at least 25%, and on-the-fly switches between the second and third compression ratios, while continuing to receive the incoming HD-UV uninterruptedly, are both visually lossless and maintain the same fixed delay between corresponding pixels of the incoming HD-UV and the outgoing HD-UV.

In one embodiment, the method illustrated in FIG. 6 supports short on-the-fly switches between the first and second compression ratios, such that the second compression ratio is used to transmit data for a duration of up to 3 HD-UV frames until switching back to using the first compression ratio. Additionally or alternatively, the method supports short on-the-fly switches between the first and second compression ratios, such that the second compression ratio is used to transmit data for a duration shorter than the duration required to transmit 30 HD-UV frames before switching back to using the first compression ratio.

Figure 7A:
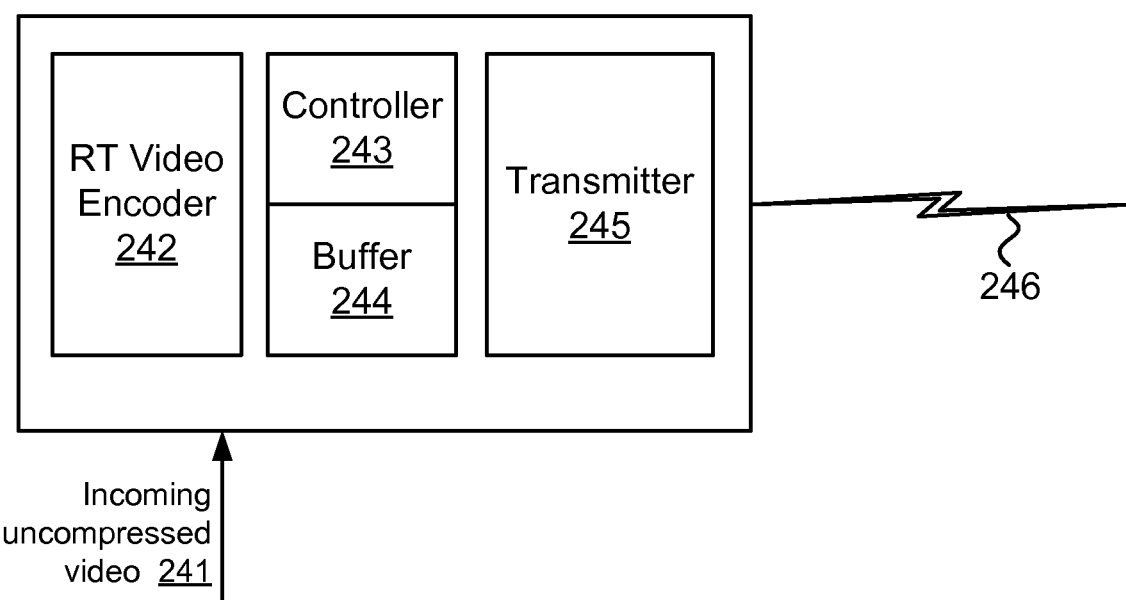
FIG. 7A illustrates one embodiment of a fixed delay video transmitter having multiple compression ratios.

FIG. 7A illustrates one embodiment of a fixed delay video transmitter having multiple compression ratios. The fixed delay video transmitter includes at least: a real-time video encoder (RT-VE) 242, a controller 243, a buffer 244, and a transmitter 245. The RT-VE 242 receives an incoming high-definition uncompressed video (HD-UV) 241, and compress the incoming HD-UV 241 into first or second light high-definition (HD) compressed videos. In one example, a first compression ratio of the first light HD compressed video is between 1:1 and 5:1, a second compression ratio of the second light HD compressed video is between 2:1 and 5:1, and the difference between the first and second compression ratios is at least 25%.

The controller 243 includes buffer 244 for adjusting the delays of the first and second light HD compressed videos. The buffer may be located in at least one of the following places: before the RT-VE 242 (i.e., it stores data before it reaches the RT-VE 242), at the RT-VE 242, and/or after the RT-VE 242 (i.e., it stores data that has left the RT-VE 242). The transmitter 245 sends the first or second light HD compressed videos over a communication link 246 after a fixed delay relative to the incoming HD-UV. In one example, the fixed delay refers to accuracy shorter than the duration of a quarter of a HD-UV frame.

In one embodiment, the fixed delay video transmitter maintains the same fixed delay for the first and second light HD compressed videos relative to the incoming HD-UV while switching on-the-fly between the first and second compression ratios, and while continuing to receive the incoming HD-UV uninterruptedly. Optionally, the switching is visually lossless.

In one embodiment, in order to maintain the same fixed delay for the first and second light HD compressed videos relative to the incoming HD-UV, the controller 243 adds a longer delay to the first light HD compressed video compared to the second light HD compressed video.

In one embodiment, the transmitter uses packets for sending the first and second light HD compressed videos. The transmitter may use fixed size packets and reduce the number of used packets as the compression ratio increases. Additionally or alternatively, the transmitter may reduce the size of at least some of the packet payloads in order to maintain a fixed packet rate with the different compression ratios. In both cases, the fixed delay may be calculated on average over a series of a few packets such that it is essentially unaffected by changes in the packet size and/or packet rate. In one example, the fixed packet rate refers to inaccuracy of less than 1% in the rate over duration of a frame.

Figure 7B:
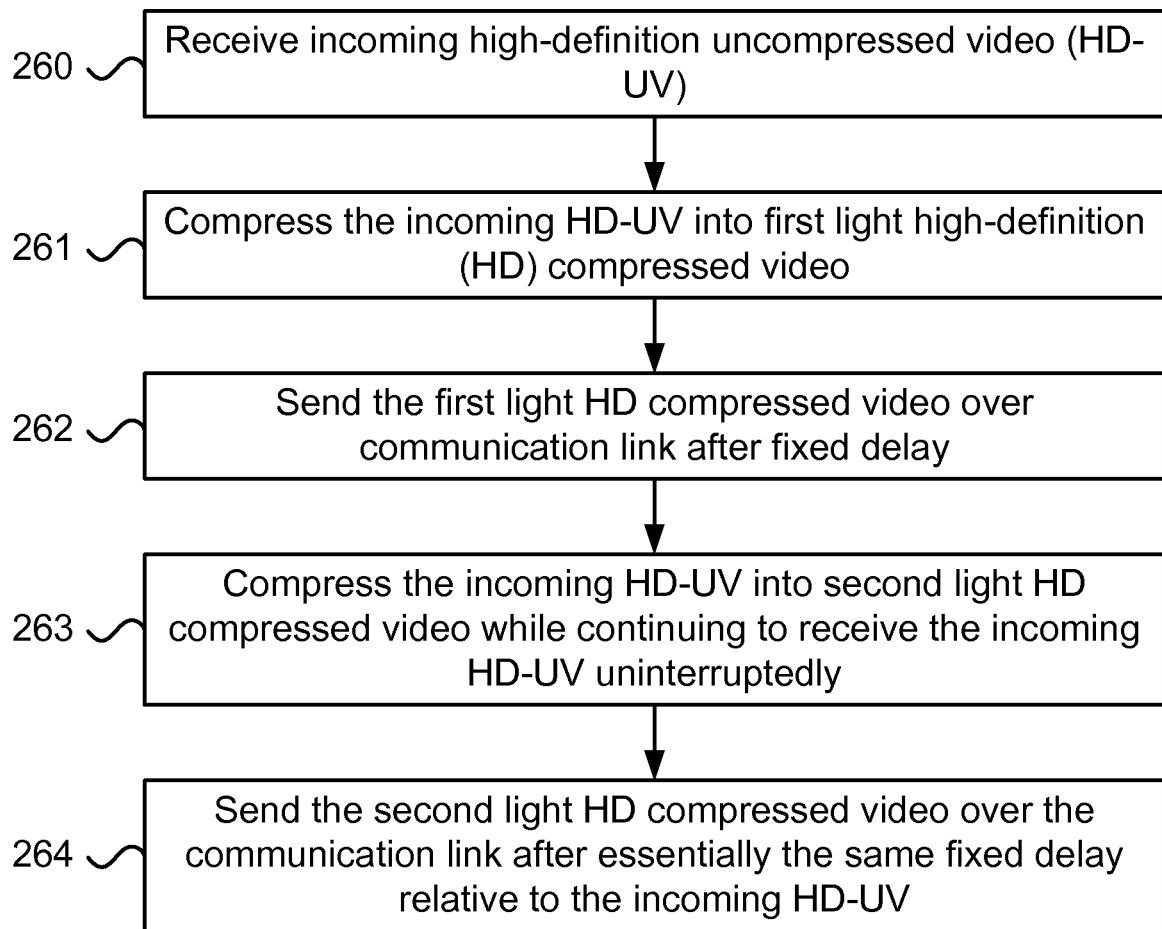
FIG. 7B illustrates one embodiment of a method for switching between different compression ratios while maintaining a fixed delay.

FIG. 7B illustrates one embodiment of a method for switching between different compression ratios while maintaining a fixed delay. The method includes the following steps: In step 260, receiving an incoming high-definition uncompressed video (HD-UV). In step 261, compressing the incoming HD-UV into a first light high-definition (HD) compressed video having a first compression ratio of between 1:1 and 5:1. In step 262, sending the first light HD compressed video over a communication link after a first fixed delay relative to the incoming HD-UV. Optionally, the first fixed delay refers to accuracy shorter than the duration of a quarter of a HD-UV frame. In step 263, compressing the incoming HD-UV into a second light HD compressed video having a second compression ratio of between 2:1 and 5:1, while continuing to receive the incoming HD-UV uninterruptedly. Optionally, the difference between the first and second compression ratios is at least 25%. And in step 264, sending the second light HD compressed video over the communication link after a second fixed delay relative to the incoming HD-UV. Optionally, the second fixed delay refers to accuracy shorter than the duration of a quarter of a HD-UV frame.

In one embodiment, the difference between the first and second fixed delays is less than 5% of the first fixed delay. The method may further include adding a longer delay to the first light HD compressed video compared to the second light HD compressed video in order to equalize the first and second fixed delays. Additionally or alternatively, switching between sending the first and second light HD compressed videos does not result in damaging video synchronization signals and video timing signals of the incoming HD-UV. Additionally or alternatively, switching between sending the first and second light HD compressed videos does not result in a missing frame line of the incoming HD-UV. Additionally or alternatively, switching between sending the first and second light HD compressed videos does not result in a missing blanking signal of the incoming HD-UV.

Figure 8A:
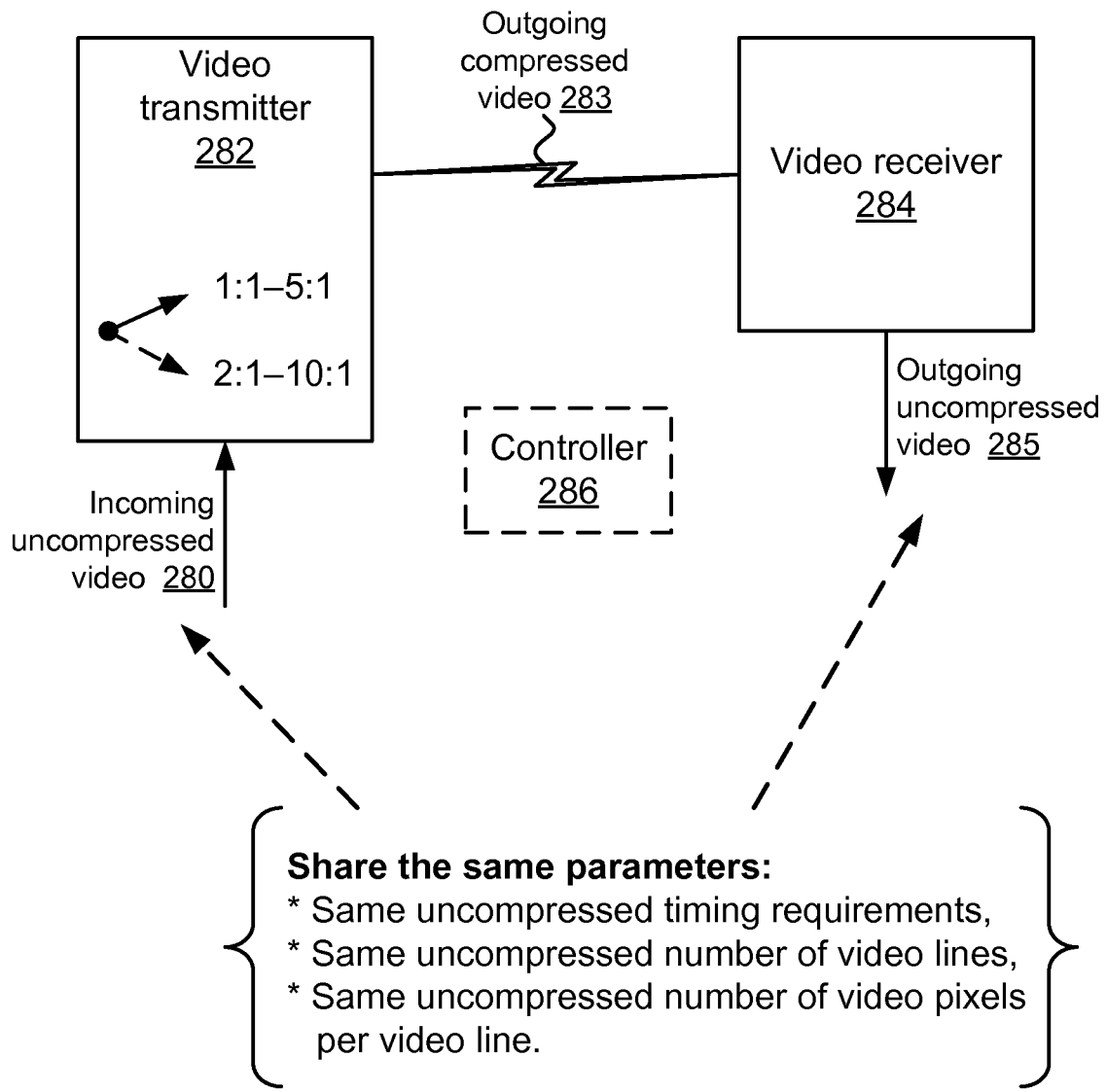
FIG. 8A illustrates one embodiment of a compression system that maintains timing and primary colors while changing video compression ratios on-the-fly.
Figure 8B:
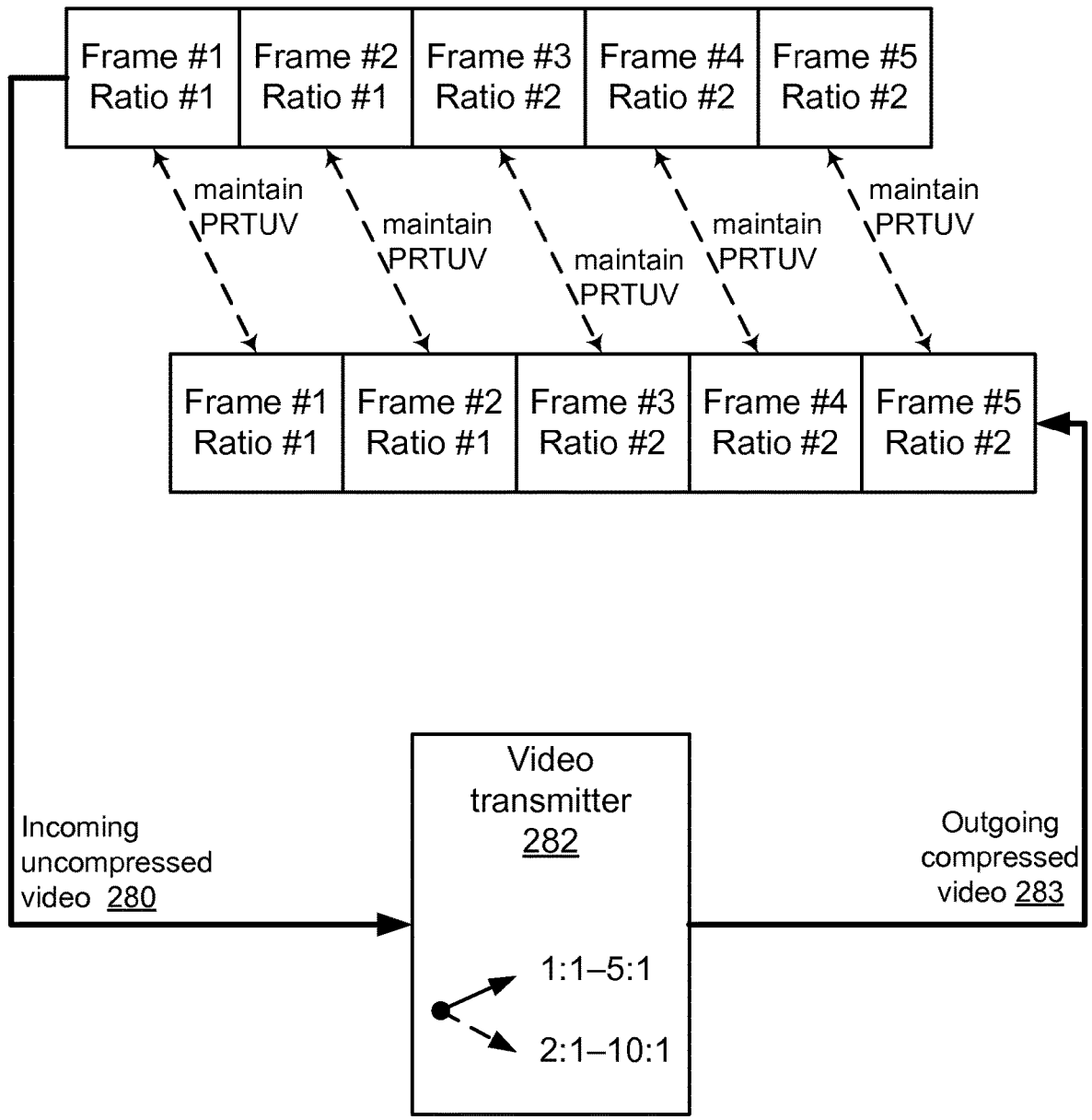
FIG. 8B illustrates one embodiment in which the outgoing HD-UV maintains the PRTUV.

FIG. 8A illustrates one embodiment of a compression system that maintains timing and primary colors while changing video compression ratios on-the-fly. The compression system includes at least: a video transmitter 282 and a video receiver 284. The video transmitter 282 receives incoming high-definition uncompressed video (HD-UV) 280 characterized by the following parameters related to uncompressed video (PRTUV): uncompressed timing requirements, uncompressed number of video lines, and uncompressed number of video pixels per video line. The video transmitter 282 compresses the incoming HD-UV 280 into a first compressed video having a first compression ratio of between 1:1 and 5:1, and sends the first compressed video over an outgoing compressed video link 283 to the video receiver 284. Upon receiving a command to smoothly change on-the-fly the compression of the incoming HD-UV 280 to a second compressed video having a second compression ratio of between 2:1 and 10:1, the video transmitter sends the second compressed video over the outgoing compressed video link 283 to the video receiver 284, without interrupting the continuous flow of the incoming HD-UV. The video receiver 284 decompresses the first and/or second compressed videos to outgoing HD-UV. FIG. 8B illustrates one embodiment in which the outgoing HD-UV maintains the PRTUV before, during, and after the change from the first compressed video to the second compressed video. Optionally, the outgoing HD-UV maintains also the primary colors of the pixels of the incoming HD-UV.

In one embodiment, the difference between the ratios of the first and second compressed videos is at least 25%. In one embodiment, the second compressed video is sent to the video receiver for a duration shorter than the duration required to transmit 30 HD-UV frames, after which the video transmitter smoothly changes on-the-fly the compression of the incoming HD-UV to use the first compression ratio, and sends the first compressed video to the video receiver, without interrupting the continuous flow of the incoming HD-UV. Additionally or alternatively, the second compressed video may be sent to the video receiver for a duration of less than 3 HD-UV frames, after which the video transmitter smoothly changes on-the-fly the compression of the incoming HD-UV to use the first compression, and sends the first compressed video to the video receiver, without interrupting the continuous flow of the incoming HD-UV.

In one embodiment, the first compressed video has compression ratio between 1:1 and 2:1, the second compressed video has compression ratio between 4:1 and 10:1, and the compression system further includes a third compressed video having a third compression ratio between 2:1 and 4:1. Optionally, an on-the-fly change between the first and third compressed videos maintains the PRTUV before, during, and after the change. Additionally or alternatively, the on-the-fly change between the first and third compressed videos maintains also the primary colors of the pixels of the incoming HD-UV.

In one example, the primary colors are Red, Yellow and Blue (RYB), or Red, Green and Blue (RGB), and maintaining the primary colors requires that the difference between corresponding pixels of the incoming and outgoing HD-UVs does not exceed a single shift on a 12 hue color wheel. In another example, the primary colors are Red, Yellow and Blue (RYB), or Red, Green and Blue (RGB), and in order to maintain the primary colors the compression does not cause artifacts that replace one primary color with another primary color.

In one embodiment, compression techniques that maintain the primary colors (Red, Yellow and Blue (RYB), or Red, Green and Blue (RGB)), in the context of the disclosed embodiments, include compression techniques causing artifacts that may affect the color depth and include compression techniques causing artifacts that may result in a single shift on a 12 hue color wheel, but exclude compression techniques causing artifacts that replace one primary color with another primary color. For example, a compression technique that reduces color depth of a pixel from 12 bits to 8 bits is considered herein a compression technique that maintains the primary colors, while compression technique that derives a pixel value just from the values of the pixel's neighbors, or duplicates a frame, are considered herein compression techniques that do not maintain the primary colors because a blue pixel may easily be replaced by a red pixel when pixels are interpolated or duplicated instead of being transmitted.

In one embodiment, the outgoing HD-UV maintains a fixed delay relative to the incoming HD-UV before, during, and after the change from the first compressed video to the second compressed video. Optionally, the fixed delay refers to accuracy shorter than the duration of a quarter of a HD-UV frame.

In one embodiment, the compression system further includes a controller 286 for issuing the command to smoothly change on-the-fly the compression of the incoming HD-UV. The controller 286 may be implemented as part of at least one of the following elements: the video transmitter, the video receiver, and/or a network controller.

Additionally or alternatively, the controller 286 may issue the command to smoothly change on-the-fly the compression of the incoming HD-UV from the first compressed video, which is compressed at the first compression ratio, to the second compressed video, which is compressed at the second compression ratio. The command may be issued in order to: (i) free up bandwidth for a new additional video stream, and/or (ii) enable a visually lossless smooth change between the incoming HD-UV and a second incoming HD-UV.

Figure 9:
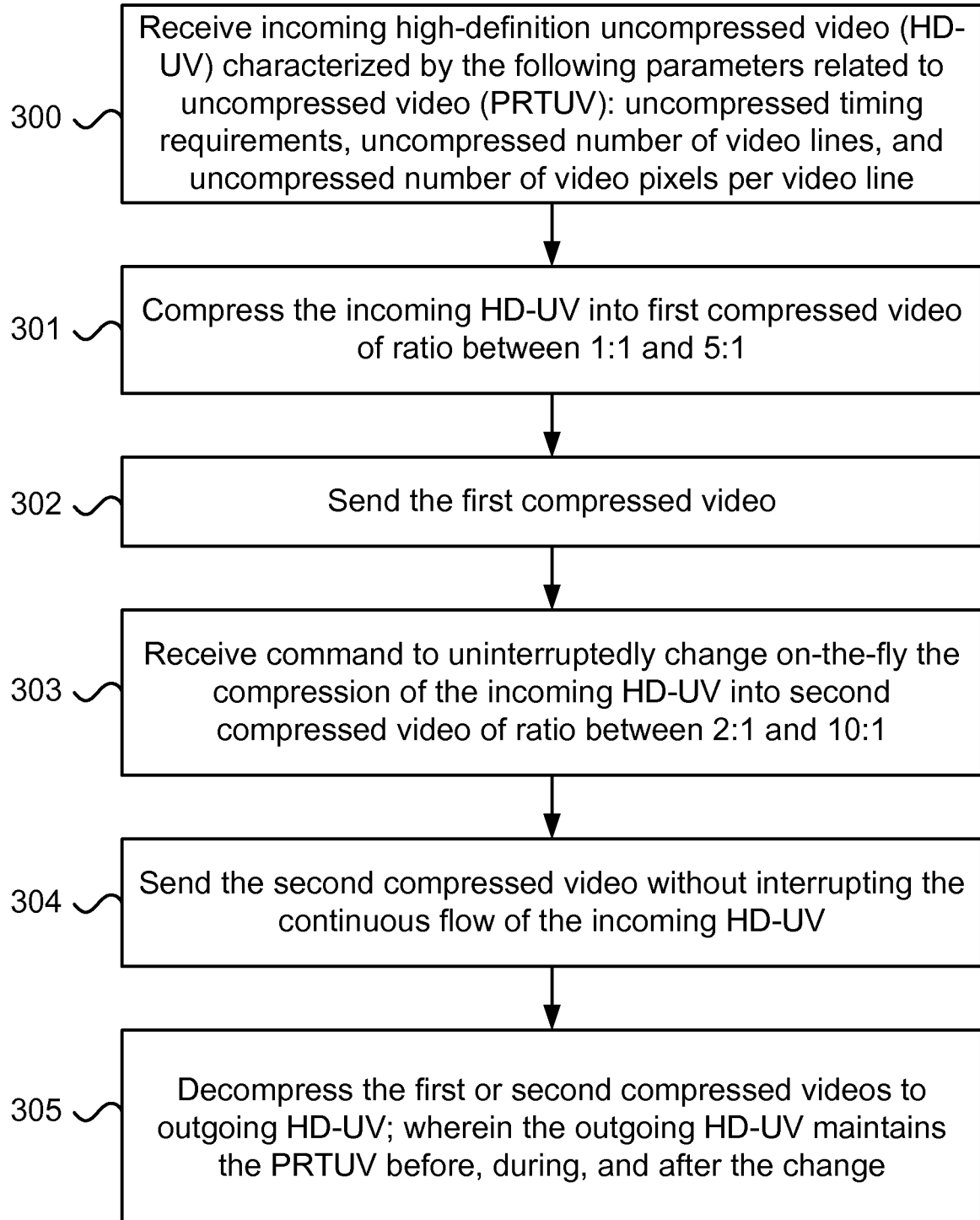
FIG. 9 illustrates one embodiment of a method for maintaining timing and primary colors while changing video compression ratios on-the-fly.

FIG. 9 illustrates one embodiment of a method for maintaining timing and primary colors while changing video compression ratios on-the-fly. The method includes the following steps: In step 300, receiving, by a video transmitter, incoming high-definition uncompressed video (HD-UV) characterized by the following parameters related to uncompressed video (PRTUV): uncompressed timing requirements, uncompressed number of video lines, and uncompressed number of video pixels per video line. In step 301, compressing the incoming HD-UV into a first compressed video having a first compression ratio of between 1:1 and 5:1. In step 302, sending the first compressed video over a communication link to a video receiver. In step 303, receiving, by the video transmitter, a command to smoothly change on-the-fly the compression of the incoming HD-UV to a second compressed video having a second compression ratio of between 2:1 and 10:1. In step 304, sending the second compressed video over the communication link to the video receiver, without interrupting the continuous flow of the incoming HD-UV. Optionally, the difference between the ratios of the first and second compressed videos is at least 25%. And in step 305, decompressing, by the video receiver, the first and/or second compressed videos to an outgoing HD-UV, wherein the outgoing HD-UV maintains the PRTUV before, during, and after the change from the first compressed video to the second compressed video. Optionally, the outgoing HD-UV maintains also the primary colors of the pixels of the incoming HD-UV.

In one embodiment, the method further includes sending the second compressed video to the video receiver during a duration shorter than the duration required to transmit 30 HD-UV frames, then smoothly changing on-the-fly the compression of the incoming HD-UV to use the first compression ratio, and sending the first compressed video to the video receiver without interrupting the continuous flow of the incoming HD-UV. Additionally or alternatively, the method further includes sending the second compressed video to the video receiver during a duration shorter than the duration required to transmit 3 HD-UV frames, then smoothly changing on-the-fly the compression of the incoming HD-UV to use the first compression ratio, and sending the first compressed video to the video receiver without interrupting the continuous flow of the incoming HD-UV.

In one embodiment of the method, the first compressed video has compression ratio between 1:1 and 2:1, the second compressed video has compression ratio between 4:1 and 10:1, and further comprising a third compressed video having a third compression ratio between 2:1 and 4:1. The method further includes performing a smooth on-the-fly change between the first and third compressed videos while maintaining the PRTUV before, during, and after the smooth change.

In one embodiment, the method further includes maintaining fixed delay between the outgoing HD-UV and the incoming HD-UV before, during, and after the change from the first compressed video to the second compressed video. Optionally, the fixed delay refers to accuracy shorter than the duration of a quarter of a HD-UV frame.

In one embodiment, the method further includes performing the smooth change on-the-fly in order to free up bandwidth for a new additional video stream. Additionally or alternatively, the method further includes performing the smooth change on-the-fly in order to enable a visually lossless switching between the incoming HD-UV and a second incoming HD-UV.

Figure 10:
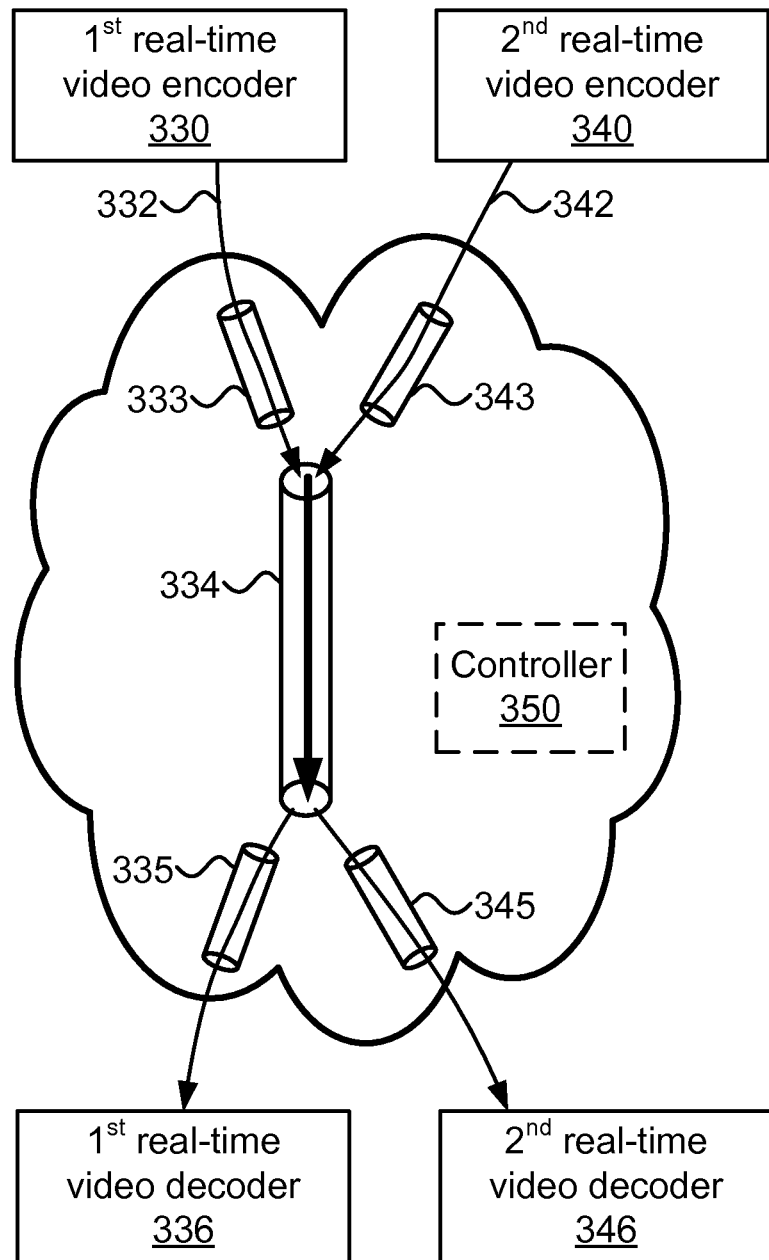
FIG. 10 illustrates one embodiment of a network that supports change to compression ratios that is visually lossless to provide network bandwidth for additional video streams.

FIG. 10 illustrates one embodiment of a network that supports change to compression ratios that is visually lossless to provide network bandwidth for additional video streams. The network includes at least a first real-time video encoder (RT-VE) 330, a first network path (333, 334, 335), a first real-time video decoder (RT-VD) 336, a second RT-VE 340, a second network path (343, 334, 345), and a second RT-VD 346. The first RT-VE 330 receives a first incoming high-definition uncompressed video (HD-UV), compresses the first incoming HD-UV into a first compressed video 332 using a first compression ratio of up to 10:1, and sends the first compressed video 332 over the first network path (333, 334, 335) to the first RT-VD 336. The first RT-VD 336 extracts an outgoing HD-UV from the first compressed video. Optionally, the outgoing HD-UV is visually lossless compared to the first incoming HD-UV.

After establishment of the first network path (333, 334, 335), and as a result of insufficient bandwidth on the common link 334 included in the first network path, the second RT-VE 340 cannot send a second compressed video 342 to the second RT-VD 346 over the second network path (343, 334, 345) that includes the common link 334. Optionally, the second RT-VE 346 receives a second incoming HD-UV and compresses the second incoming HD-UV into the second compressed video using a second compression ratio of up to 10:1. Therefore, in order to enable the additional video stream, the first RT-VE increases on-the-fly the first compression ratio in proportion to the insufficient bandwidth and in a manner that is visually lossless for a human viewing the outgoing HD-UV. As a result of increasing on-the-fly of the first compression ratio, the second RT-VE can send the second compressed video to the second RT-VD, over the second network path, in parallel to the first compressed video.

In one embodiment, the network further includes a controller 350 for estimating the insufficient bandwidth, and then ordering the first RT-VE 330 to increases on-the-fly the first compression ratio in proportion to the insufficient bandwidth, and based on the estimated insufficient bandwidth. Optionally, the controller 350 is implemented as part of at least one of the following elements: the RT-VE 330, the RT-VE 340, the RT-VD 336, the RT-VD 346, and/or a network controller. Additionally or alternatively, the network may be a resource reservation network.

In one example, the increasing on-the-fly of the first compression ratio in proportion to the insufficient bandwidth indicates that the increase releases no more than 150% of the insufficient bandwidth, in relation to the bandwidth used by the first compressed video before the increasing of the first compression ratio.

In one example, the first compression ratio, before increasing it on-the-fly, was between 1:1 and 5:1. In another example, the first and second compression ratios are between 1:1 and 5:1.

In one embodiment, the increasing on-the-fly of the first compression ratio maintains the same fixed delay between corresponding pixels of the first incoming HD-UV and the outgoing HD-UV. Optionally, the fixed delay refers to accuracy shorter than the duration of a quarter of a HD-UV frame. Additionally or alternatively, the increasing on-the-fly of the first compression ratio maintains a total delay between corresponding frames of the first incoming HD-UV and the outgoing HD-UV that is below the duration of two video frames.

In one example, visually lossless increasing on-the-fly of the first compression indicates that a comparison between corresponding frames of the first incoming HD-UV and the outgoing HD-UV demonstrates that video synchronization signals and video timing signals are uninterrupted as a result of the increasing on-the-fly of the first compression ratio. In another example, visually lossless increasing on-the-fly of the first compression indicates that a comparison between corresponding frames of the first incoming HD-UV and the outgoing HD-UV demonstrates that the increasing on-the-fly of the first compression ratio does not result in one or more missing video frames. In still another example, visually lossless increasing on-the-fly of the first compression indicates that a comparison between corresponding frames of the first incoming HD-UV and the outgoing HD-UV demonstrates that the increasing on-the-fly of the first compression ratio does not result in one or more missing video blanking signals.

In one embodiment, the first RT-VE 330 comprises a buffer for storing the first incoming HD-UV to make the calculations required to compress the first incoming HD-UV into the first compressed video, and the capacity of the buffer is below the capacity needed to store two video frames of the first incoming HD-UV.

Figure 11:
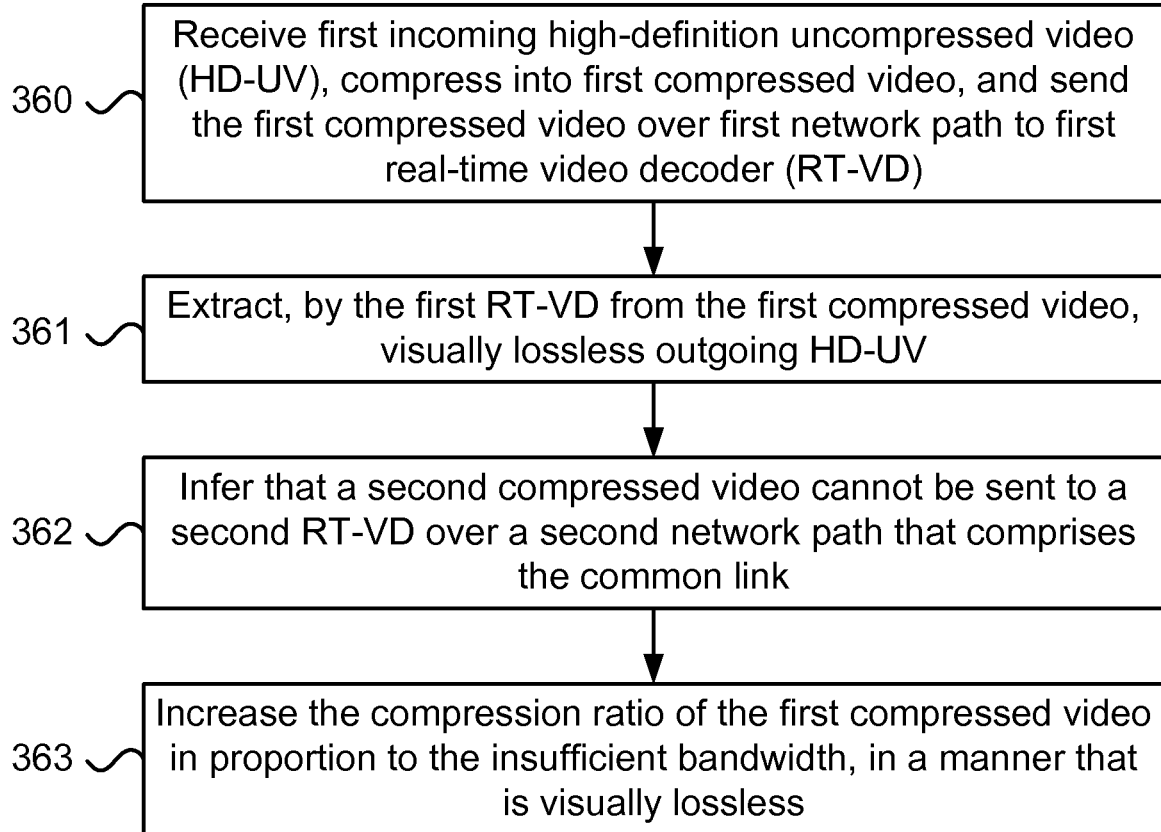
FIG. 11 illustrates one embodiment of a method for visually lossless changing of compression ratios to provide network bandwidth for additional streams.

FIG. 11 illustrates one embodiment of a method for visually lossless changing of compression ratios to provide network bandwidth for additional streams. The method includes the following steps: In step 360, receiving, by a first real-time video encoder (RT-VE), a first incoming high-definition uncompressed video (HD-UV), compressing the first incoming HD-UV into a first compressed video using a first compression ratio of up to 10:1, and sending the first compressed video over a first network path to a first real-time video decoder (RT-VD). In step 361, extracting, by the first RT-VD, outgoing HD-UV from the first compressed video. Optionally, the outgoing HD-UV is visually lossless compared to the first incoming HD-UV. In step 362, inferring that after establishing the first network path, and as a result of insufficient bandwidth on a common link included in the first network path, a second RT-VE cannot send a second compressed video to a second RT-VD over a second network path that includes the common link. Optionally, the second RT-VE receives a second incoming HD-UV and compresses the second incoming HD-UV into the second compressed video using a second compression ratio of up to 10:1. And in step 363, increasing on-the-fly the first compression ratio in proportion to the insufficient bandwidth, in a manner that is visually lossless for a human viewing the outgoing HD-UV. As a result of increasing of the first compression ratio, the second RT-VE can send the second compressed video to the second RT-VD, over the second network path, in parallel to the first compressed video.

In one embodiment, the method further includes estimating the insufficient bandwidth, and then ordering the first RT-VE to increases on-the-fly the first compression ratio in proportion to the insufficient bandwidth, based on the estimated insufficient bandwidth.

In one example, the increasing on-the-fly of the first compression ratio in proportion to the insufficient bandwidth indicates that the increasing releases no more than 150% of the insufficient bandwidth. Additionally or alternatively, the first and second compression ratios may be between 1:1 and 5:1.

In one embodiment, the increasing on-the-fly of the first compression ratio maintains the same fixed delay between corresponding pixels of the first incoming HD-UV and the outgoing HD-UV. Optionally, the fixed delay refers to accuracy shorter than the duration of a quarter of a HD-UV frame. Additionally or alternatively, the increasing on-the-fly of the first compression ratio may maintain a total delay between corresponding frames of the first incoming HD-UV and the outgoing HD-UV that is below the duration of two video frames.

Figure 12:
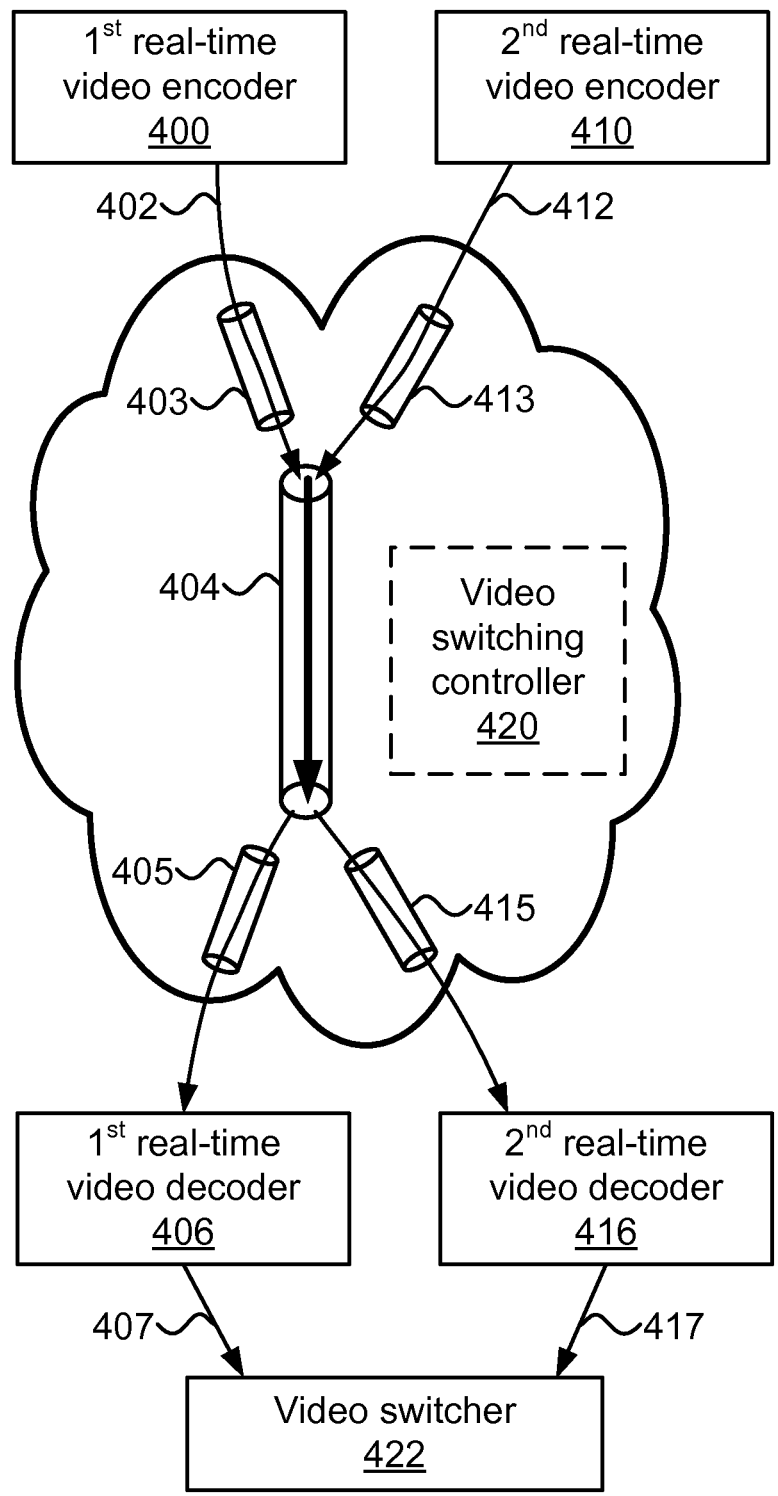
FIG. 12 illustrates one embodiment of a network that supports smooth switching of video sources.

FIG. 12 illustrates one embodiment of a network that supports smooth switching of video sources. The network includes at least a first real-time video encoder (RT-VE) 400, a first network path (403, 404, 405), a first real-time video decoder (RT-VD) 406, a second RT-VE 410, a second network path (413, 404, 415), a second RT-VD 416, a video switching controller 420, and a video switcher 422. The first RT-VE receives a first incoming high-definition uncompressed video (HD-UV), compresses the first incoming HD-UV into a first compressed video 402 using a first compression ratio of up to 5:1, and sends the first compressed video over the first network path (403, 404, 405) to the first RT-VD 406 that extracts a first outgoing HD-UV 407 from the first compressed video 402. The second RT-VE 410 receives a second incoming HD-UV, compresses the second incoming HD-UV into a second compressed video 412 using a second compression ratio of up to 5:1, and sends the second compressed video over the second network path (413, 404, 415) to the second RT-VD 416 that extracts a second outgoing HD-UV 417 from the second compressed video 412.

The first and second network paths share a common link 404 having insufficient bandwidth to carry both the first and second compressed videos (402, 412). In order to support smooth switching of video sources, the video switching controller 420 synchronizes the switching between the first and second incoming HD-UVs by: indicating the first RT-VE 400 and the second RT-VE 410 to increase the first and second compression ratios to ratios that enable the common link 404 to carry both the first and second compressed videos (402, 412), indicating the video switcher 422 to perform a smooth switching between the first and second outgoing HD-UVs (407, 417), indicating the first RT-VE 400 to stop sending the first compressed video 402 after the smooth switching, and indicating the second RT-VE 410 to decrease the second compression ratio. Additionally, in order to enable the smooth switching, the transients of the first and second outgoing HD-UV (407, 417), as a result of increasing the first and second compression ratios, are performed in a visually lossless manner compared to the first and second incoming HD-UVs.

In one embodiment, the video switcher receives the first and second outgoing HD-UVs, performs the smooth switching, and outputs uncompressed video. In one example, the smooth switching between the first and second outgoing HD-UVs is a smooth switching without interruption during the switching between the first and second outgoing HD-UVs.

In another embodiment, the video switcher receives the first and second compressed videos, performs the smooth switching, and outputs uncompressed video. In one example, the video switching controller is implemented at the video switcher.

In one embodiment, the first and second incoming HD-UV are synchronized, and the video switcher does not perform video scaling. Alternatively, the first and second incoming HD-UV are unsynchronized, and the video switcher further performs video scaling. In one embodiment, the video switching controller is implemented as part of at least one of the following devices: the first RT-VE, the second RT-VE, the video switcher, the first RT-VD, the second RT-VD, and a stand-alone device.

In one embodiment, the first RT-VE comprises at least two different real-time video encoders for different compression ratios. Additionally or alternatively, the first RT-VE comprises a low compression real-time video encoder to compress the first compressed video before increasing the first compression ratio, and a higher compression real-time video encoder to compress the first compressed video after increasing the first compression ratio. In one example, the first compression ratio was between 1:1 and 3:1 before increasing its compression ratio.

In one embodiment, the increasing of the first compression ratio maintains the same fixed delay between corresponding pixels of the first incoming HD-UV and the first outgoing HD-UV. Optionally, the fixed delay refers to accuracy shorter than the duration of a quarter of a HD-UV frame. Additionally or alternatively, the increasing of the first compression ratio maintains a total delay between corresponding frames of the first incoming HD-UV and the first outgoing HD-UV that is below the duration of two video frames.

In one embodiment, the smooth switching is visually lossless for a human viewing the HD-UV provided by the video switcher. In another embodiment, the smooth switching indicates that a comparison between the last few corresponding frames of the first compressed video and the first outgoing HD-UV until the smooth switching, and a comparison between the first few corresponding frames of the second compressed video and the second outgoing HD-UV immediately after the smooth switching, demonstrate that video synchronization signals and video timing signals are uninterrupted as a result of the smooth switching. In still another embodiment, the smooth switching indicates that a comparison between the last few corresponding frames of the first compressed video and the first outgoing HD-UV until the smooth switching, and a comparison between the first few corresponding frames of the second compressed video and the second outgoing HD-UV immediately after the smooth switching, demonstrate that the smooth switching does not result in one or more missing video frames. In still another embodiment, the smooth switching indicates that a comparison between the last few corresponding frames of the first compressed video and the first outgoing HD-UV until the smooth switching, and a comparison between the first few corresponding frames of the second compressed video and the second outgoing HD-UV immediately after the smooth switching, demonstrate that the smooth switching does not result in one or more missing video blanking signals. And in still another embodiment, smooth switching indicates that no pixels are lost, excluding color depth, as a result of the smooth switching.

Figure 13:
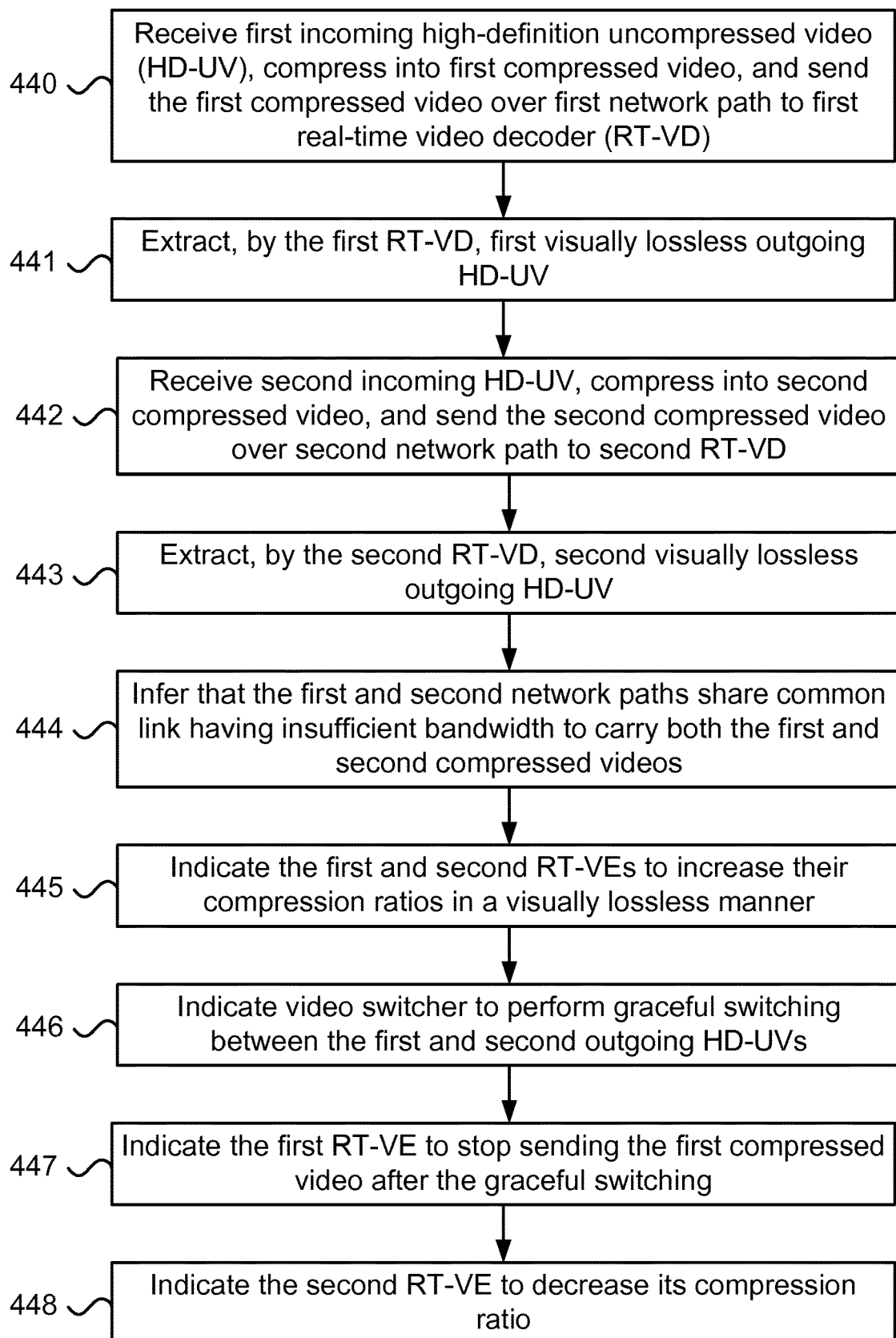
FIG. 13 illustrates one embodiment of a method for smooth switching of video sources.

FIG. 13 illustrates one embodiment of a method for smooth switching of video sources. The method includes the following steps: In step 440, receiving, by a first real-time video encoder (RT-VE), a first incoming high-definition uncompressed video (HD-UV), compressing the first incoming HD-UV into a first compressed video using a first compression ratio of up to 5:1, and sending the first compressed video over a first network path to a first real-time video decoder (RT-VD). In step 441, extracting, by the first RT-VD, a first outgoing HD-UV from the first compressed video. In step 442, receiving, by a second RT-VE, a second incoming HD-UV, compressing the second incoming HD-UV into a second compressed video using a second compression ratio of up to 5:1, and sending the second compressed video over a second network path to a second RT-VD. In step 443, extracting, by the second RT-VD, a second outgoing HD-UV from the second compressed video. In step 444, inferring that the first and second network paths share a common link having insufficient bandwidth to carry both the first and second compressed videos. And synchronizing a smooth switching between the first and second outgoing HD-UVs using the following steps: In step 445, indicating the first RT-VE and the second RT-VE to increase the first and second compression ratios to ratios that enable the common link to carry both the first and second compressed videos. In step 446, indicating a video switcher to perform the smooth switching between the first and second outgoing HD-UVs. In step 447, indicating the first RT-VE to stop sending the first compressed video after the smooth switching. And in step 448, indicating the second RT-VE to decrease the second compression ratio.

In one embodiment, the smooth switching between the first and second outgoing HD-UVs is a smooth switching without interruption during the switching between the first and second outgoing HD-UVs.

In one embodiment, the first and second incoming HD-UV are unsynchronized, and further comprising performing video scaling by the video switcher.

In one embodiment, the method further includes operating, by the first RT-VE, a low compression real-time video encoder for compressing the first compressed video before increasing the first compression ratio, and operating a higher compression real-time video encoder to compress the first compressed video after increasing the first compression ratio. In one example, the first compression ratio was between 1:1 and 3:1 before increasing its compression ratio.

In one embodiment, the increasing of the first compression ratio maintains the same fixed delay between corresponding pixels of the first incoming HD-UV and the first outgoing HD-UV. Optionally, the fixed delay refers to accuracy shorter than the duration of a quarter of a HD-UV frame. Additionally or alternatively, the increasing of the first compression ratio maintains a total delay between corresponding frames of the first incoming HD-UV and the first outgoing HD-UV that is below duration of two video frames.

Herein, a predetermined value, such as a predetermined confidence level or a predetermined threshold, is a fixed value and/or a value determined any time before performing a calculation that compares a certain value with the predetermined value. A value is also considered to be a predetermined value when the logic, used to determine whether a threshold that utilizes the value is reached, is known before start of performing computations to determine whether the threshold is reached.

In this description, references to "one embodiment" mean that the feature being referred to may be included in at least one embodiment of the invention. Moreover, separate references to "one embodiment" or "some embodiments" in this description do not necessarily refer to the same embodiment. Additionally, references to "one embodiment" and "another embodiment" may not necessarily refer to different embodiments, but may be terms used, at times, to illustrate different aspects of an embodiment.

The embodiments of the invention may include any variety of combinations and/or integrations of the features of the embodiments described herein. Although some embodiments may depict serial operations, the embodiments may perform certain operations in parallel and/or in different orders from those depicted. Moreover, the use of repeated reference numerals and/or letters in the text and/or drawings is for the purpose of simplicity and clarity and does not in itself dictate a relationship between the various embodiments and/or configurations discussed. The embodiments are not limited in their applications to the details of the order or sequence of steps of operation of methods, or to details of implementation of devices, set in the description, drawings, or examples. Moreover, individual blocks illustrated in the figures may be functional in nature and therefore may not necessarily correspond to discrete hardware elements.

While the methods disclosed herein have been described and shown with reference to particular steps performed in a particular order, it is understood that these steps may be combined, sub-divided, and/or reordered to form an equivalent method without departing from the teachings of the embodiments. Accordingly, unless specifically indicated herein, the order and grouping of the steps is not a limitation of the embodiments. Furthermore, methods and mechanisms of the embodiments will sometimes be described in singular form for clarity. However, some embodiments may include multiple iterations of a method or multiple instantiations of a mechanism unless noted otherwise. For example, when a processor is disclosed in one embodiment, the scope of the embodiment is intended to also cover the use of multiple processors. Certain features of the embodiments, which may have been, for clarity, described in the context of separate embodiments, may also be provided in various combinations in a single embodiment. Conversely, various features of the embodiments, which may have been, for brevity, described in the context of a single embodiment, may also be provided separately or in any suitable sub-combination. Embodiments described in conjunction with specific examples are presented by way of example, and not limitation. Moreover, it is evident that many alternatives, modifications, and variations will be apparent to those skilled in the art. It is to be understood that other embodiments may be utilized and structural changes may be made without departing from the scope of the embodiments. Accordingly, this disclosure is intended to embrace all such alternatives, modifications, and variations that fall within the spirit and scope of the appended claims and their equivalents.

What is claimed is:

1. A compression system configured to maintain parameters related to uncompressed video (PRTUV) while changing video compression ratios on-the-fly, comprising:
    a video transmitter configured to receive in real-time incoming high-definition uncompressed video (HD-UV) characterized by the following PRTUV: uncompressed timing requirements, uncompressed number of video lines, and uncompressed number of video pixels per video line;
    the video transmitter is further configured to compress the incoming HD-UV into a first compressed video having a first compression ratio of between 1:1 and 5:1, and to send the first compressed video over a communication link to a video receiver;
    the video transmitter is further configured to receive a command to smoothly change on-the-fly the compression of the incoming HD-UV to a second compressed video having a second compression ratio of between 2:1 and 10:1, and to send the second compressed video over the communication link to the video receiver, without interrupting continuous flow of the incoming HD-UV; wherein the difference between the ratios of the first and second compressed videos is at least 25%; and
    the video receiver is configured to decompress the first or second compressed videos to an outgoing HD-UV;
    wherein the outgoing HD-UV maintains the PRTUV before, during, and after the change from the first compressed video to the second compressed video.

2. The compression system of claim 1, wherein the second compressed video is sent to the video receiver for a duration shorter than the duration required to transmit 30 HD-UV frames, after which the video transmitter smoothly changes on-the-fly the compression of the incoming HD-UV to use the first compression ratio, and sends the first compressed video to the video receiver, without interrupting the continuous flow of the incoming HD-UV.

3. The compression system of claim 1, wherein the second compressed video is sent to the video receiver for a duration shorter than the duration required to transmit 3 HD-UV frames, after which the video transmitter smoothly changes on-the-fly the compression of the incoming HD-UV to use the first compression ratio, and sends the first compressed video to the video receiver, without interrupting the continuous flow of the incoming HD-UV.

4. The compression system of claim 1, wherein the first compressed video has compression ratio between 1:1 and 2:1, the second compressed video has compression ratio between 4:1 and 10:1, and further comprising a third compressed video having a third compression ratio between 2:1 and 4:1; wherein on-the-fly smooth change between the first and third compressed videos maintains the PRTUV before, during, and after the smooth change.

5. The compression system of claim 1, wherein the outgoing HD-UV further maintains the primary colors of pixels of the incoming HD-UV before, during, and after the change from the first compressed video to the second compressed video.

6. The compression system of claim 5, wherein the primary colors are Red, Yellow and Blue (RYB), or Red, Green and Blue (RGB), and maintaining the primary colors requires that the difference between corresponding pixels of the incoming and outgoing HD-UVs does not exceed a single shift on a 12 hue color wheel.

7. The compression system of claim 5, wherein the primary colors are Red, Yellow and Blue (RYB), or Red, Green and Blue (RGB), and in order to maintain the primary colors the compression does not cause artifacts that replace one primary color with another primary color.

8. The compression system of claim 1, wherein the outgoing HD-UV maintains a fixed delay relative to the incoming HD-UV before, during, and after the change from the first compressed video to the second compressed video.

9. The compression system of claim 1, further comprising a controller configured to issue the command to smoothly change on-the-fly the compression of the incoming HD-UV, wherein the controller is implemented as part of at least one of the following elements: the video transmitter, the video receiver, and a network controller.

10. The compression system of claim 1, further comprising a controller configured to issue the command to smoothly change on-the-fly the compression of the incoming HD-UV from the first compressed video to the second compressed video; wherein the command is issued in order to free up bandwidth for a new additional video stream.

11. The compression system of claim 1, further comprising a controller configured to issue the command to smoothly change on-the-fly the compression of the incoming HD-UV from the first compressed video to the second compressed video; wherein the command is issued in order to enable a visually lossless smooth change between the incoming HD-UV and a second incoming HD-UV.

12. A method for maintaining parameters related to uncompressed video (PRTUV) while changing video compression ratios on-the-fly, comprising:
    receiving in real-time, by a video transmitter, incoming high-definition uncompressed video (HD-UV) characterized by the following PRTUV: uncompressed timing requirements, uncompressed number of video lines, and uncompressed number of video pixels per video line;
    compressing the incoming HD-UV into a first compressed video having a first compression ratio of between 1:1 and 5:1;

sending the first compressed video over a communication link to a video receiver;

receiving, by the video transmitter, a command to smoothly change on-the-fly the compression of the incoming HD-UV to a second compressed video having a second compression ratio of between 2:1 and 10:1;

sending the second compressed video over the communication link to the video receiver, without interrupting continuous flow of the incoming HD-UV; wherein the difference between the ratios of the first and second compressed videos is at least 25%; and decompressing, by the video receiver, the first or second compressed videos to an outgoing HD-UV; wherein the outgoing HD-UV maintains the PRTUV before, during, and after the change from the first compressed video to the second compressed video.

13. The method of claim 12, further comprising sending the second compressed video to the video receiver during a duration shorter than the duration required to transmit 30 HD-UV frames, then smoothly changing on-the-fly the compression of the incoming HD-UV to use the first compression ratio, and sending the first compressed video to the video receiver without interrupting the continuous flow of the incoming HD-UV.

14. The method of claim 12, further comprising sending the second compressed video to the video receiver during a duration shorter than the duration required to transmit 3 HD-UV frames, then smoothly changing on-the-fly the compression of the incoming HD-UV to use the first compression ratio, and sending the first compressed video to the video receiver without interrupting the continuous flow of the incoming HD-UV.

15. The method of claim 12, wherein the first compressed video has compression ratio between 1:1 and 2:1, the second compressed video has compression ratio between 4:1 and 10:1, and further comprising a third compressed video having a third compression ratio between 2:1 and 4:1; and further comprising performing a smooth on-the-fly change between the first and third compressed videos while maintaining the PRTUV before, during, and after the smooth change.

16. The method of claim 12, wherein the outgoing HD-UV further maintains the primary colors of pixels of the incoming HD-UV before, during, and after the change from the first compressed video to the second compressed video.

17. The method of claim 16, wherein the primary colors are Red, Yellow and Blue (RYB), or Red, Green and Blue (RGB), and performing the change from the first compressed video to the second compressed video such that the difference between corresponding pixels of the incoming and outgoing HD-UVs does not exceed a single shift on a 12 hue color wheel.

18. The method of claim 12, further comprising maintaining a fixed delay between the outgoing HD-UV and the incoming HD-UV before, during, and after the change from the first compressed video to the second compressed video.

19. The method of claim 12, further comprising performing the smooth change on-the-fly in order to free up bandwidth for a new additional video stream.

20. The method of claim 12, further comprising performing the smooth change on-the-fly in order to enable a visually lossless switching between the incoming HD-UV and a second incoming HD-UV.

* * * * *